United States Patent [19]
Parker et al.

[11] Patent Number: 4,843,084
[45] Date of Patent: Jun. 27, 1989

[54] THERMOSTAT CONTROL SYSTEM

[75] Inventors: Jeffrey L. Parker; Edward Parker, both of Jacksonville, Fla.

[73] Assignee: Parker Electronics, Inc., Jacksonville, Fla.

[21] Appl. No.: 13,869

[22] Filed: Feb. 12, 1987

[51] Int. Cl.4 .............................................. G05D 23/00
[52] U.S. Cl. ................................ 364/505; 364/551.01; 165/22; 236/1 B
[58] Field of Search ........................ 165/14, 16, 22, 26, 165/27; 236/49, 1 C, 1 B; 364/505, 506, 557, 550, 551, 571, 143–145

[56] References Cited

U.S. PATENT DOCUMENTS

| | | | |
|---|---|---|---|
| 4,386,649 | 6/1983 | Hines et al. | 364/557 |
| 4,388,692 | 6/1983 | Jones et al. | 364/557 |
| 4,530,395 | 7/1985 | Parker et al. | 236/1 C |
| 4,682,279 | 7/1987 | Watabe | 165/26 |
| 4,683,939 | 8/1987 | Levine | 165/22 |
| 4,716,957 | 1/1988 | Thompson et al. | 165/22 |

Primary Examiner—Parshotam S. Lall
Assistant Examiner—Ellis B. Ramirez

[57] ABSTRACT

A microcomputer-controlled thermostat for use in monitoring and controlling a single zone HVAC system which provides conditioned air to one or more zones. The thermostat can be programmed and used either as a monitor thermostat to control the HVAC unit alone and/or to control the HVAC unit and its damper in a multiple zone mode. The thermostat is also programmed as a slave thermostat in a master-slave relationship with a monitor thermostat. The microcomputer memory is supplemented with additional ROM containing control algorithms for use in system operation. Logic circuitry is used to recognize commands as being for operation of the HVAC unit, the operation of the damper, or selection of which systems sensors are to be enabled. A real time clock circuit in the monitor thermostat is used to supply data for time-based system operation.

72 Claims, 9 Drawing Sheets

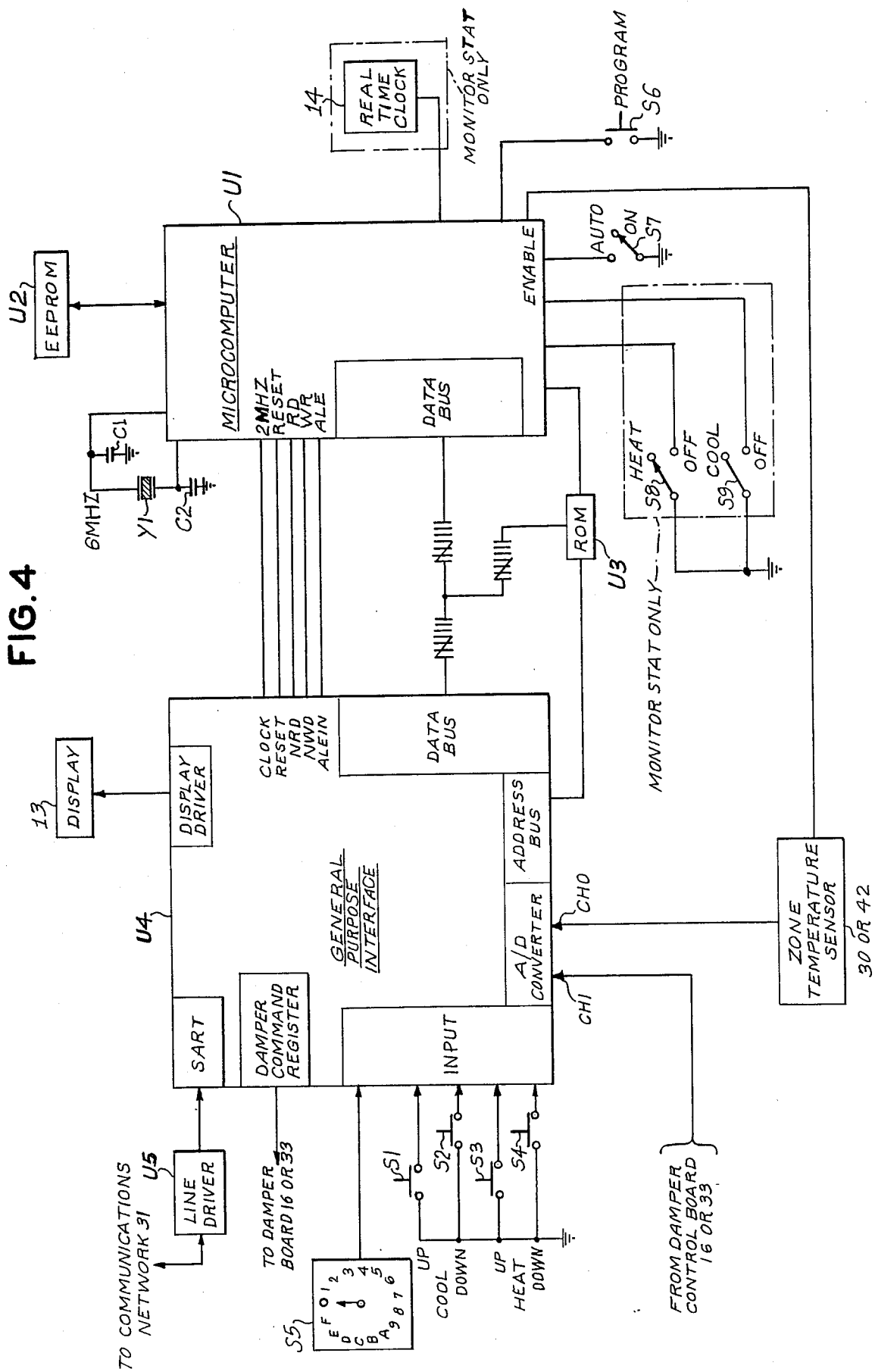

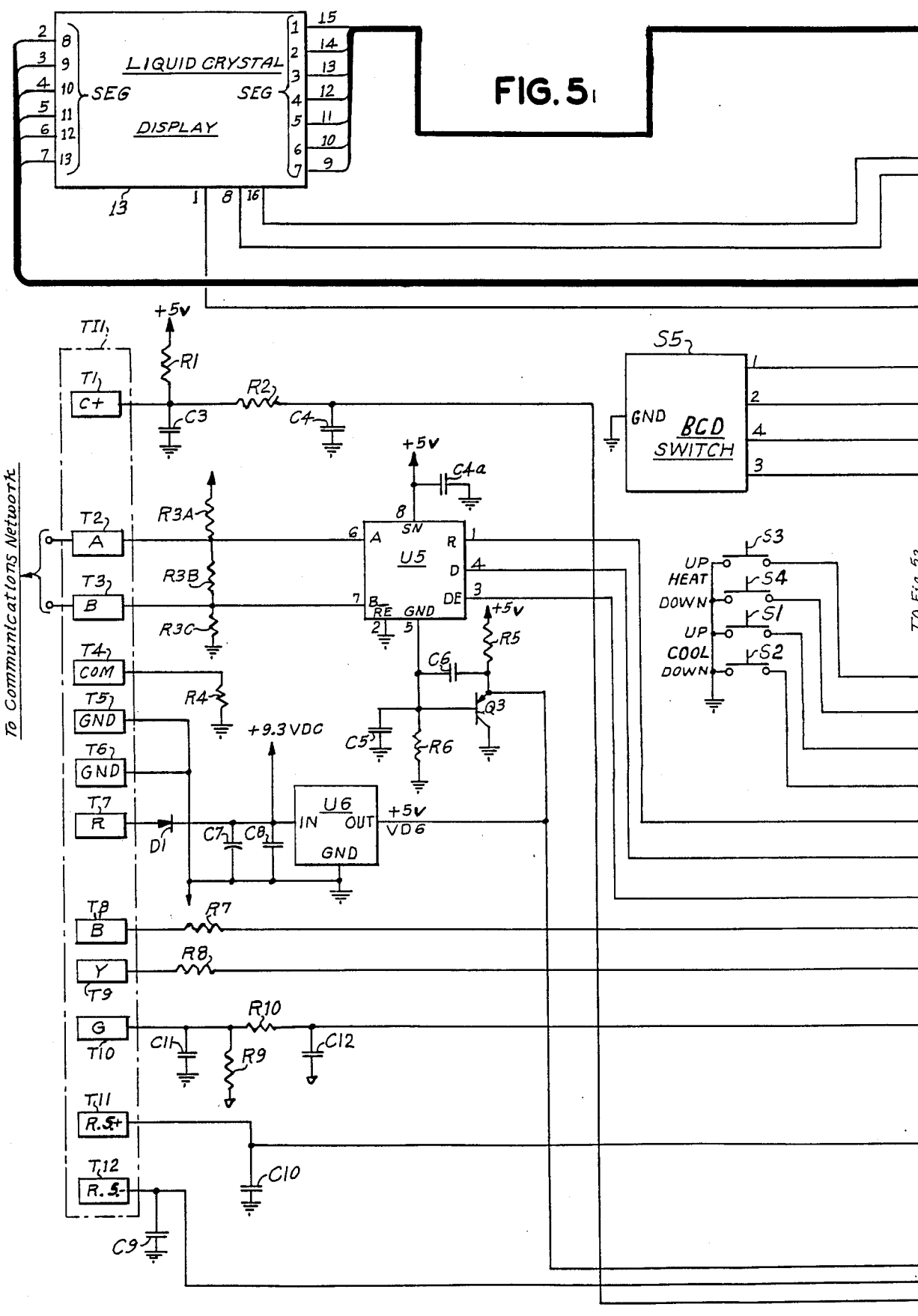
FIG. 5₁

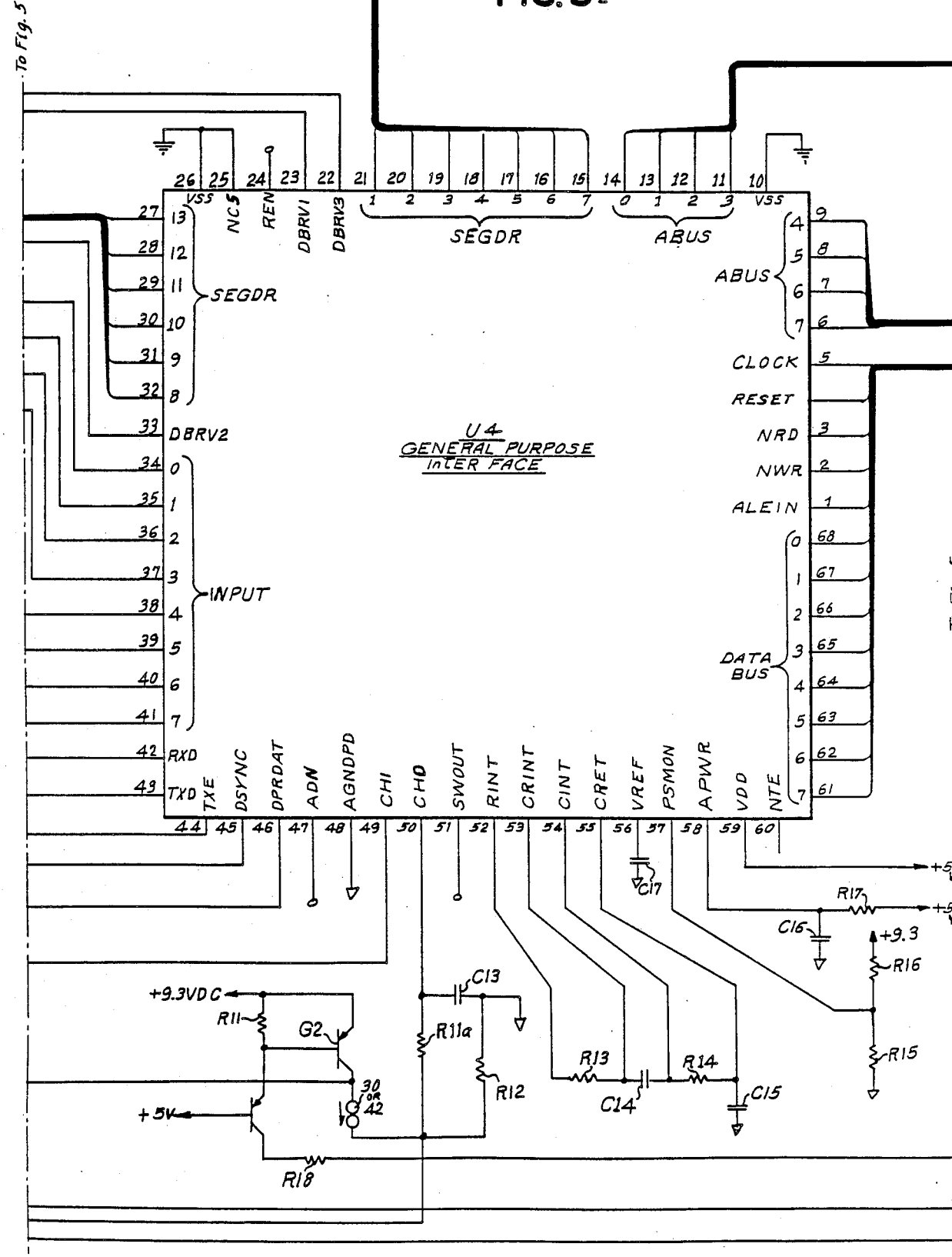
FIG. 5₂

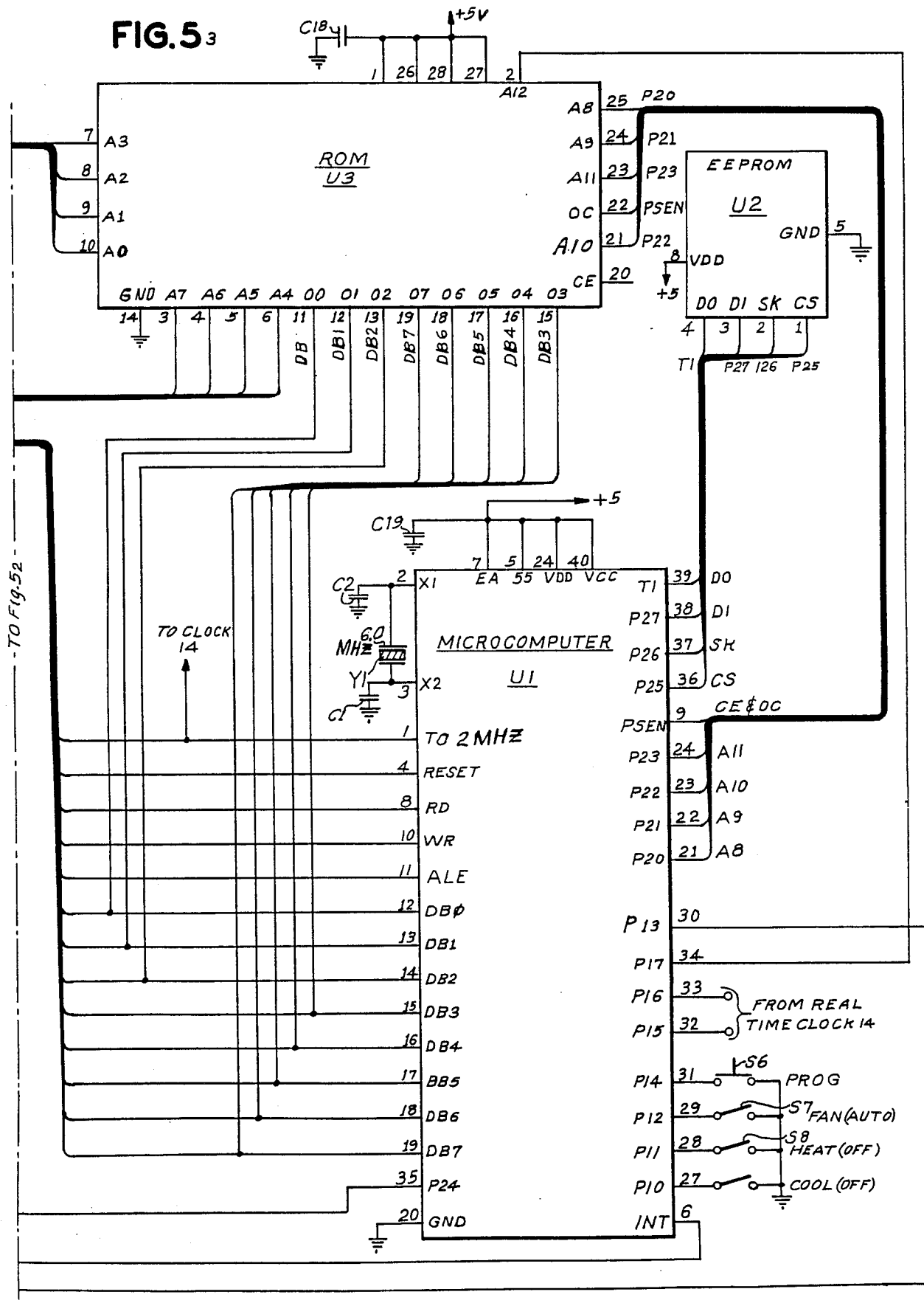
FIG. 5₃

THERMOSTAT CONTROL SYSTEM

BACKGROUND OF THE INVENTION

1. Field of the Invention

The present invention relates to the field of control devices and methods for use with heating, ventilation, and air conditioning (HVAC) units and particularly to thermostat-based control devices.

2. Prior Art

The present invention relates to microcomputer-controlled thermostat means for use in controlling the conditioning of air in multiple zones by way of a single-zone HVAC unit.

A number of methods of controlling the conditions in a plurality of zones from only a single zone HVAC unit are known to the prior art. A description of the difficulties and limitations associated with many of the methods attempted is disclosed in U.S. Pat. No. 4,530,395 (Parker, et al.) and is relevant here. Briefly, the problems center around the means by which a single-zone HVAC unit can be controlled from more than one thermostat. Probably one of the best solutions to this problem that is found in the prior art is disclosed in such patent. The objective there was to provide control of a single zone HVAC unit and its air distribution systems from a common set of thermostats in two or more zones wherein each thermostat could control both the single zone HVAC unit through a "monitor control" and its own respective zone damper. The system disclosed in such patent provides a "central control monitor" which receives information from the various individual zones and compares this information with various preset data to then properly control the dampers and the HVAC unit. While the system as described did meet the objectives of multiple zone control of a single zone HVAC unit it required the use of a dedicated microprocessor-controlled monitor to receive data from a plurality of zone thermostats. In the present invention, similar control of a single zone HVAC unit for use in multiple zones is accomplished by microcomputer controlled thermostats which can operate in either a slave or master function thus avoiding the need for complex and dedicated central control monitors. It is believed that the system and methods in accord with this invention which allows for control of a single HVAC utilizing master/slave thermostats in lieu of central control units represents a substantial departure from any prior art.

FEATURES OF THE INVENTION

Principal features of the invention include a microcomputer controlled thermostat wherein the microcomputer is supplemented by (1) an electronically erasable programmable read only memory (EEPROM) through which temperature settings and other parameters can be stored and (2) a read only memory (ROM) containing control algorithms in the form of instruction codes and fixed data for system operation, data display, and asynchronous communication to an external communications bus. Programming many operations of the thermostat is accomplished through a program switch to the microcomputer and a general purpose interface (GPI) also having data input switches.

The thermostat also has interface circuitry to receive inputs in the form of data and control signals and output signals from local and remote temperature detectors and by way of input ports.

In addition, switches allow for the enabling or disabling of the heating and cooling modes of the HVAC unit.

A damper control board contains circuitry to route operating signals from the microcomputer to the damper motor, the HVAC unit control relays and to an analog header for the selective enabling of remote analog sensing devices such as temperature and humidity detectors. The circuity in the damper control board also enables duct temperature and damper travel limit sensors.

In addition, the thermostat contains a real time clock for use in programming the operation of the device during different times-of-day and days of the week.

SUMMARY OF THE INVENTION

A thermostat according to this invention is used in a system for monitoring and controlling the condition of the air in one or more zones when using a single zone HVAC unit. The improved thermostat can be used in a single zone mode to control an HVAC unit or as a controlling device in a multiple zone mode controlling other thermostats, each of which control a damper. The thermostat employs a microprocessor-controlled circuit to supply output signals to a damper control board having logic circuitry to direct control signals to an HVAC unit (monitor-stat only) or to the damper control relays and for enabling analog sensors powered via the damper control circuitry.

The multiple zone mode involves the thermostat programmed as a "monitor-stat" to control its own damper as well as the HVAC unit. The thermostat can also be used as a "slave-stat" which operates a damper by use of its own programming and in response to signals from a monitor-stat. Further, a monitor-stat can receive data from and send data to higher intelligence such as a computer command center. In operation, the thermostats will be time-based with the monitor-stat including a real time clock and transmitting time data to each slave-stat.

In one aspect of the invention the thermostat means operates the first control means of an HVAC unit and the control means for one damper, and includes a first circuit means responding to input signals for establishing operating limits for one zone and providing a first digital word input signal representative of such limits; second circuit means responding to input signals indicative of the actual condition of air in one zone for providing a second digital word output signal representative of the actual condition of air therein; third circuit means adapted to be coupled to a peripheral circuit for receiving data from the peripheral circuit and for providing a third digital word output signal representative of the information contained in such data; fourth circuit means responding to output signals from the first, second, and third circuit means for providing fourth digital word output signals for operating the control means of one damper and the first control means of the HVAC unit; programmable logic means for providing digital word input signals to the fourth circuit means for selectively controlling the fourth circuit means; and logic means for selectively operating one damper control means and the first control means of the HVAC unit in response to respective fourth digital word input signals from the fourth circuit means.

In other aspects the thermostat includes means for providing information to a peripheral circuit, including any digital word signal associated with the first, second, and third circuit means and the programmable logic means. A first sensor is located in a zone for providing an output signal representative of the actual temperature of the zone with the second circuit means including means responsive to the output signal from the first sensor for providing a second digital word output signal representative of the actual temperature in its own zone.

The first circuit means has means responsive to input signals for establishing the desired temperature in its own zone and providing a first digital word output signal representative of the desired temperature therein.

The fourth circuit means is selectively controlled by the programmable logic means for comparing a digital word representative of the actual temperature of one zone and a digital word representative of desired temperature in the zone for determining the demand for heating or cooling or no demand in the zone.

The thermostat also includes a second sensor located in the duct for determining the temperature therein and providing an output signal representative of the temperature in the duct, the second circuit responding to the output signal from the second sensor and providing a digital word output signal representative of the duct temperature. The duct temperature sensor is located upstream of the damper supplying the zone.

Other aspects relate to the fact that the fourth circuit means is selectively controlled by the programmable logic means for comparing a digital word representative of zone temperature in its own zone and a digital word representative of duct temperature and thus determines the desired mode of operation of the damper. The fourth circuit is also selectively controlled by programmable logic for determining the desired mode of operation of an HVAC unit in response to the demand for heating and cooling or no demand in its own zone.

The programmable logic includes a first program such that when duct temperature in its own duct is greater than zone temperature a digital word output signal is provided from the fourth circuit to the logic for operating its own damper in the heating mode and for operating the damper in the cooling mode when the temperature in the duct is less than zone temperature and the HVAC unit is deactivated.

A second program is included such that when sufficient demand for heating or cooling exists in one zone the fourth circuit provides a first output signal to the logic for positioning the damper in the heating or cooling mode respectively; and, when suffficient demand for heating or cooling no longer exists in the zone, a third output signal for deactivating the HVAC unit.

A third program is included such that when the HVAC unit is deactivated, the fourth circuit provides digital word output signals to the logic for operating its own damper in the heating or cooling or ventilation mode in response to a comparison of duct temperature, and desired zone temperature and actual zone temperature of the zone.

A fourth program exists such that when duct temperature of one duct is within predetermined limits established by the programmable logic digital word signals are provided from the fourth circuit to the logic means for operating one damper in the ventilation mode when there is no demand for heating or cooling in its own zone or a demand different from that derived from a comparison between actual zone temperature and duct temperature in the zone.

An indicating means provides data indicative of the informtion in any digital word signal associated with the first, second, and third circuit and the programmable logic.

The fourth circuit means is selectively controlled by the programmable logic means for determining the desired mode of operation of an HVAC unit in response to data received by the third circuit means representative of the temperature of air in the other zones and in response to data indicative of the condition of air in its own zone. The fourth circuit means is selectively controlled by the programmable logic means in response to data received by the third circuit means indicative of the demand for heating or cooling or no demand from each other zone and in response to data indicative of the demand for heating or cooling or no demand in its zone and provides output signals representative of the desired mode of operation of the HVAC unit when the number of zones having demand for heating or cooling equals or exceeds a predetermined number established by the first circuit means.

A fifth program is provided in the logic means such that when demand for heating or cooling exists in a number of zones equal to or exceeding the predetermined number established by the first circuit means, the fourth circuit means provides first output signals to the peripheral circuit means associated with the other zones indicative of the desired mode of the HVAC unit, a second signal to the logic means for operating the damper associated with its own zone in the heating or cooling mode, respectively, a third signal to the logic means for operating the HVAC unit in the heating or cooling mode, respectively, and and fourth output signal to the logic means for deactivating the HVAC unit when sufficient demand for heating or cooling no longer exists.

A sixth program is included such that when the number of zones demand heating or cooling equals or exceeds a predetermined number established by the first circuit means, the zone with the greatest demand is chosen as a reference zone and the HVAC unit is operated by the logic means in the heating or cooling mode, respectively, until the reference zone is substantially satisfied.

The seventh program is included such that when the number of zones demanding heating is equal to the number of zones demanding cooling, with each number being greater than a predetermined number established by the first circuit means the fourth circuit means provides a first output signal to the peripheral circuit means and to the logic means for operating all dampers in a mode coincident with the heating or cooling mode of the zone with the greatest demand, a second output signal to the logic means for activating the HVAC unit in a mode coincident with the demand for heating or cooling mode of the zone with the greatest demand, and a third output signal to the logic means for deactivating the HVAC unit when the demand for heating or cooling has been substantially satisfied in the zone with the greatest demand.

The eighth program is included such that when the HVAC unit has been activated in the heating or cooling mode duct temperature associated with its own zone and data indicative of duct temperature in each other zone is received by the third circuit means is compared with first predetermined limits established by the programmable logic means and the fourth circuit provides an output signal to the logic means for increasing the heating or cooling supplied by the HVAC unit when duct temperature is not within the predetermined limits.

The programmable logic means also includes a ninth program such that when duct temperature in any zone exceeds a second predetermined limit established by the programmable logic, the fourth circuit means provides an output signal to the logic means for deactivating the HVAC unit irrespective of the demand for heating or cooling in any zone.

A tenth program is included for operating the damper in the heating or cooling mode when the ventilation mode is not applicable. An eleventh program allows the choice of a second reference zone when a zone develops a greater demand than the first reference zone when the HVAC unit is being operated in a given mode.

The first circuit allows for the establishment of different operating limits during a plurality of distinct time periods.

The assembly is made time-based by the addition of a real time clock and the operating limits estabished by the first circuit means which includes the desired condition of the air in the zone during a plurality of distinct time periods, with the fourth circuit means responsive to signals including the data indicative of the real time for operating the control means of one damper and the first control means during a plurality of the distinct time periods that are established.

The thermostat also includes means for providing information to peripheral circuit means, the information including real time data.

The operating limits for a zone includes the temperature limits, and the first circuit includes means responsive to input signals establishing the temperature desired in the zone during a plurality of distinct time periods, and provides digital word output signals representative of the desired temperature therein during the time periods. Also the demand for heating or cooling or no demand in the zone is determined during the time periods. Similarly the desired mode of operation of the damper is determined during a distinct time period, as well as determination of the desired mode of operation of the HVAC unit in response to the demand for heating or cooling or no demand in the zone during a distinct time period. When duct temperature in the duct is greater than zone temperature the damper is operated in the heating mode and the damper is operated in the cooling mode when the temperature in the duct is less than zone temperature when the HVAC unit is deactivated during a distinct time period. When sufficient demand for heating or cooling exists in the zone during a distinct time period the fourth circuit means provides a first output signal to the logic means for positioning the damper in the heating or cooling mode respectively and then a second output signal activates the HVAC unit in the heating or cooling mode respectively; and, when sufficient demand for heating or cooling no longer exists in the zone, a third output signal deactivates the HVAC unit.

The programmable logic means further includes a third program such that when the HVAC unit is deactivated, the fourth circuit provides digital word output signals to the logic means for operating the damper in the heating or cooling or ventilation mode in response to a comparison of duct temperature of the duct, desired zone temperature during a distinct time period and actual zone temperature of said one zone. A fourth program is provided such that when duct temperature of the duct is within predetermined limits established by the programmable logic means digital word signals are provided from the fourth circuit means to the logic means for operating the damper in the ventilation mode when there is no demand for heating or cooling in the zone or a demand different from that derived from a comparison between actual zone temperature and duct temperture in the zone.

The fourth circuit means of a thermostat is selectively controlled by programmable logic means for determining the desired mode of operation of an HVAC unit during a distinct time period in response to data received by the third circuit means representative of the temperature of air in the other zones and in response to data indicative of the condition of air in the zone associated with the thermostat.

The fourth circuit is selectively controlled by the programmable logic in response to data received by the third circuit indicative of the demand for heating or cooling or no demand from each other zone and in response to data indicative of the demand for heating or cooling or no demand in one zone and provides output signals representative of the desired mode of operation of the HVAC unit during a distinct time period when the number of zones having demand for heating or cooling equals or exceeds a predetermined number established by the first circuit means. Various other of the aforesaid programs, including the fifth, sixth, seventh, eighth, ninth, tenth and eleventh, similarly are operational during distinct time periods as would be be apparent to those skilled in the art.

In another aspect of the invention a system for monitoring and controlling the condition of the air in a single zone mode using only a single zone HVAC unit, the thermostat has a first circuit means responsive to input signals for establishing the operating limits for a zone and supplying a digital word output representative of the limits including desired temperature; a second circuit that is responsive to input signals indicative of the actual temperature of the air in the zone and providing a digital word output representative of the air temperature; first and second sensors for measuring zone and duct temperature respectively and providing signals to the second circuit means; a third circuit means selectively controlled by programmable logic means and receiving input signals from the first and second circuits for operating the logic means which operates the control means of the HVAC unit.

The third circuit is controlled via several programs in the programmable logic means for operating the HVAC unit in response to comparisons of actual temperature, duct temperature and desired temperature and, with real time data, the thermostat will operate the HVAC unit via the programs in a time-based mode.

The thermostat can also operate only the damper in a slave mode in response to signals from higher intelligence such as a thermostat in a multiple zone mode. The thermostat in a slave mode has first and second circuit means for establishing desired operating limits including desired temperature and actual temperature and first and second temperature sensors supplying zone and duct temperature data with a third circuit means for receiving data from higher intelligence. A fourth circuit means is selectively controlled by programmable logic means for operating the control means of a damper by logic means, as before. The thermostat in the slave mode can receive real time data from peripheral circuits for time-based operation of several programs contained within the programmable logic means. Improved algorithms provide improved control over prior art devices.

DETAILED DESCRIPTION OF THE DRAWINGS

The novel features believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

FIG. 4 is a simplified schematic diagram of the circuitry employed in the monitor and slave thermostats;

Figure 6:
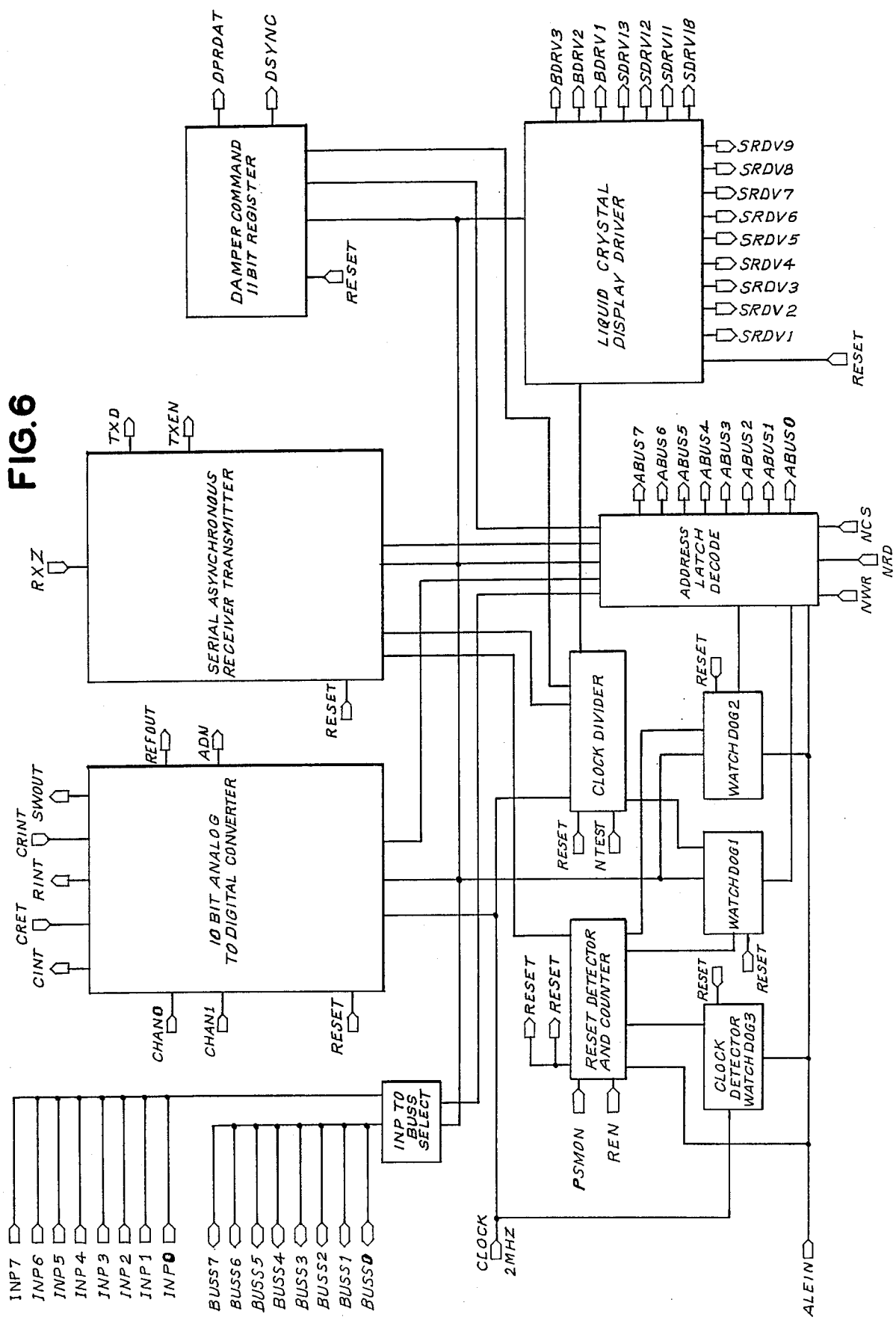
Figure 7:
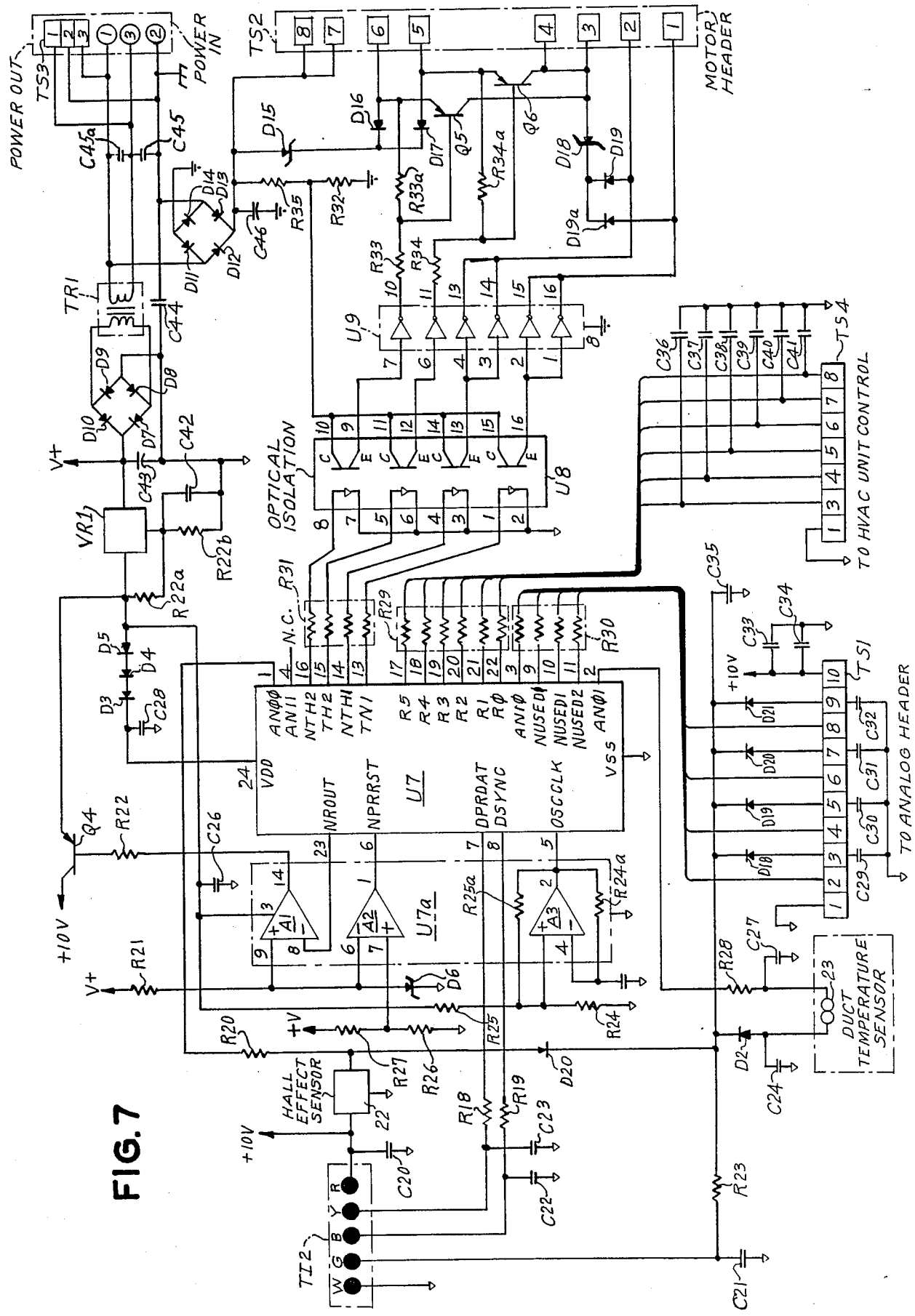
Figure 8:
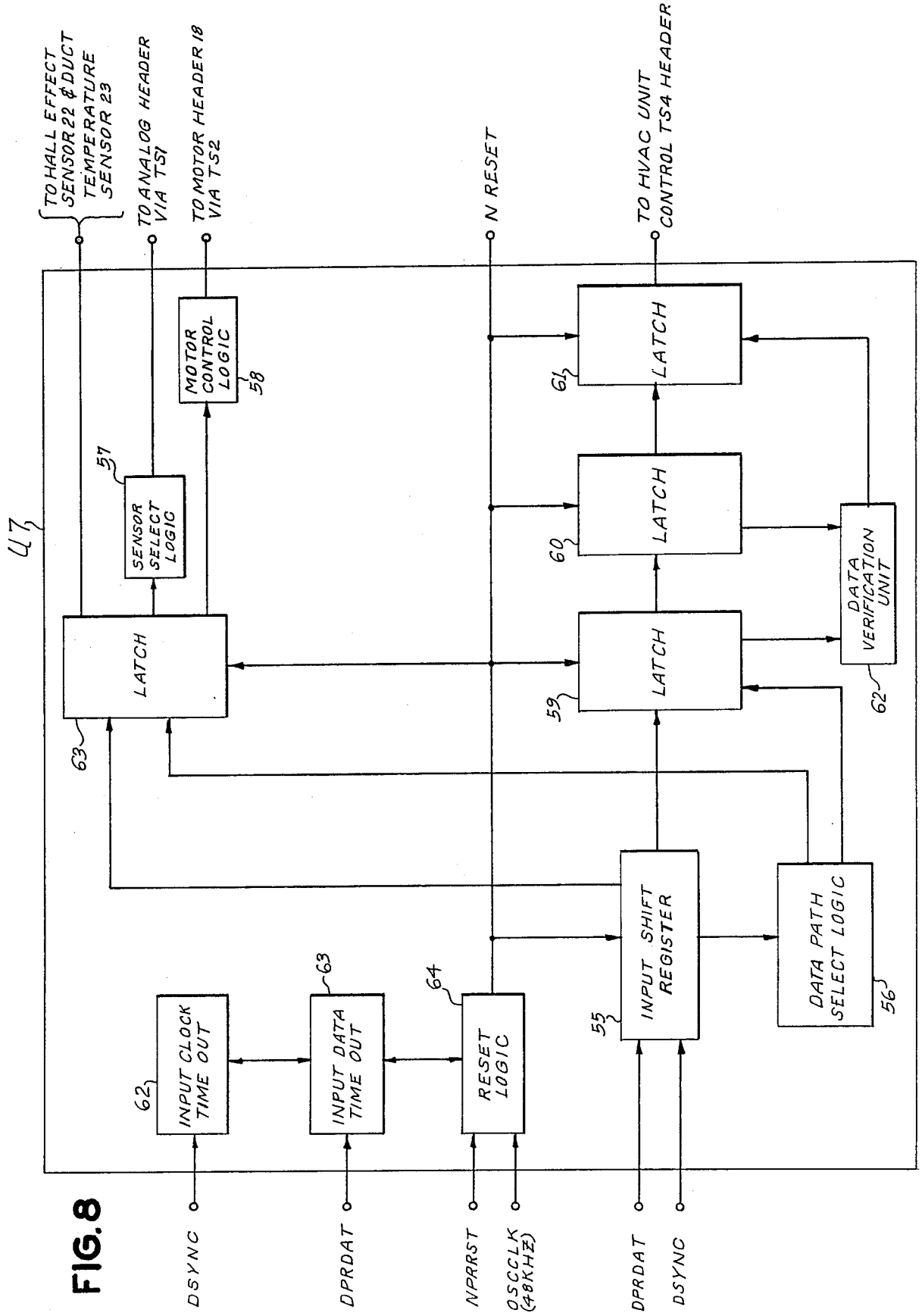
Figure 9:
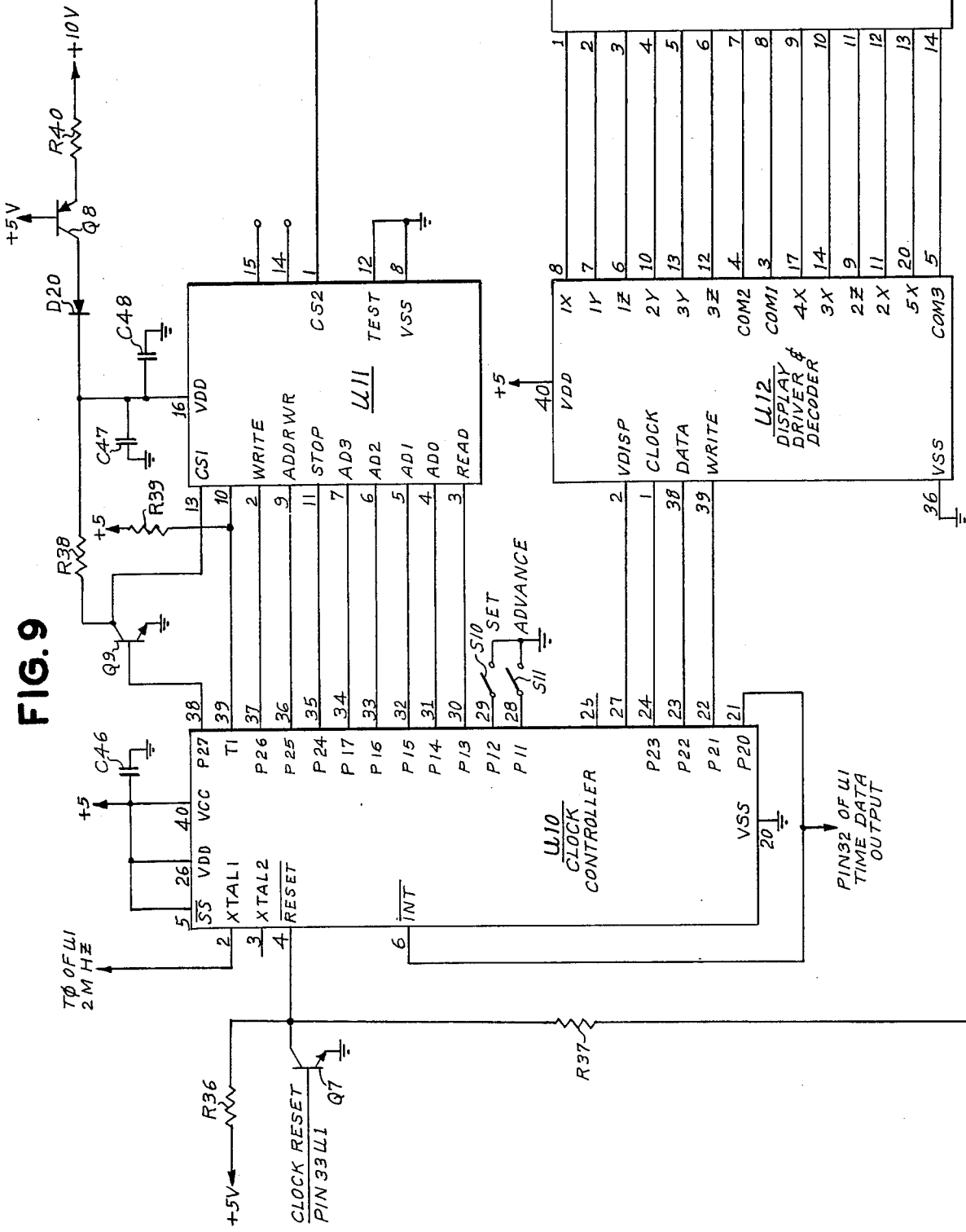

FIGS. $5_1$ to $5_3$ are detailed schematic diagrams of the circuitry employed in the thermostats;

FIG. 6 is a functional block diagram of the general purpose inferface used in the thermostats;

FIG. 7 is a detailed schematic diagram of the circuity of the damper control board;

FIG. 8 is a simplified functional block diagram of the central control circuit of the damper control board;

FIG. 9 is a detailed schematic diagram of the real time clock circuitry employed in the monitor thermostat.

DETAILED DESCRIPTION OF THE PREFERRED EMBODIMENT

Figure 1:
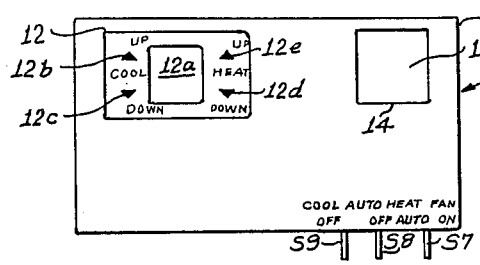
FIG. 1 is a front elevational view of the monitor-thermostat of the control system in accord with this invention.

Referring now to the drawing, a thrmostat of the control assembly is shown generally at 10 in FIG. 1, thermostat 10 having a removable front cover 11 and a front display panel 12 comprising a cutout section 12a for viewing a liquid crystal display 13 and four resilient portions 12b, 12c, 12d and 12e for the operation of four switches located below the cover 11, and shown in FIG. 4 as switches S1 and S2 for cool setpoints "up" and "down" respectively. In normal operation, the setpoint for initiation of the cooling function is displayed in the upper left hand section of display 13 and the setpoint for initiation of the heating function is displayed in the lower right hand section. Adjustment of the heating and cooling setpoints are made by depressing switches S1–S4 as desired.

The front cover 11 of the monitor thermostat has a cutout section 14a for viewing the display U13 of a real time clock 14 discussed in more detail below. It is to be noted that the slave thermostat does not includes such a cutout section 14a in its cover since a real time clock is not neeed therein, but the real time can be displayed on the display 13 beneath cutout section 12a.

Figure 2:
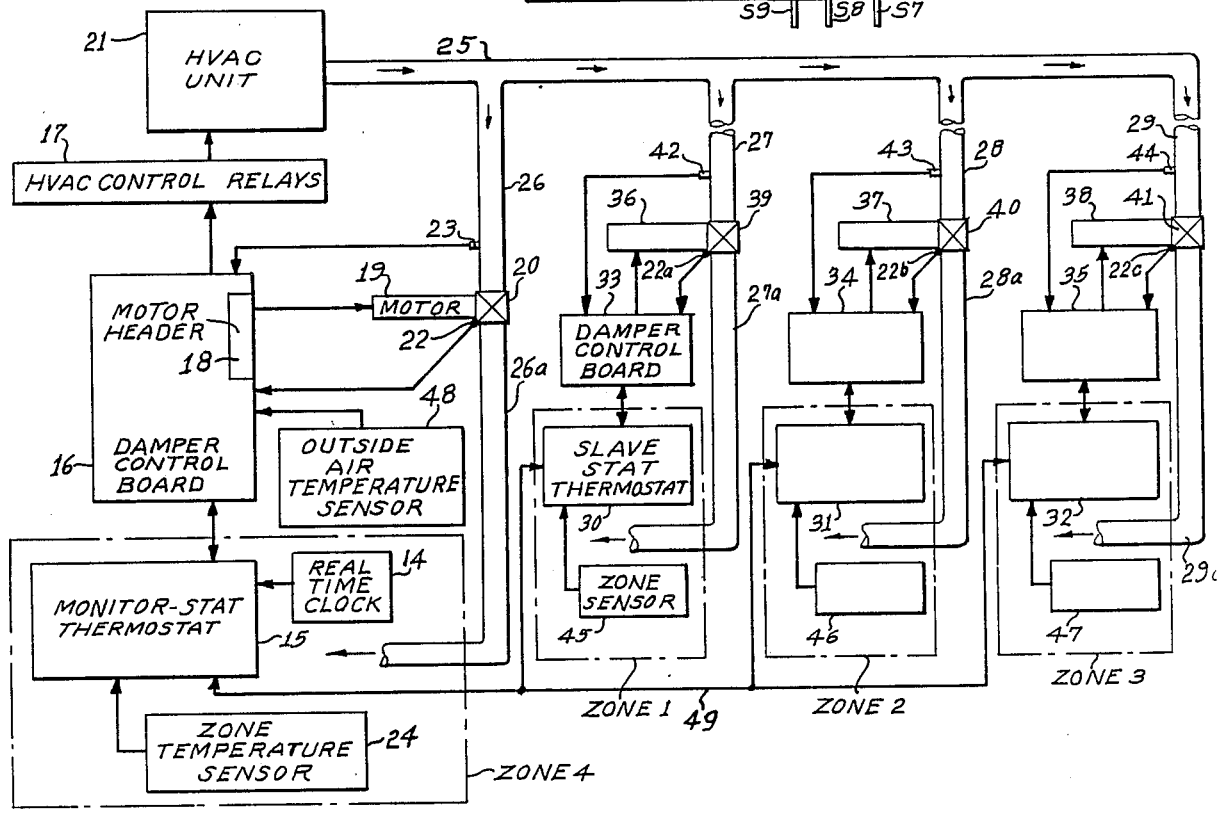
FIG. 2 is a pictorial diagram of the thermostat control system in accord with this invention.

Referring now to FIG. 2, an overview of the operation of the thermostat 10 in a HVAC system will be helpful in understanding the details hereinafter set forth. For example, four thermostats 10 are employed in a configuration of a monitor-stat 15 and three slave-stats 30, 31, 32. The monitor-stat 15 sends data to a damper control board 16 wherein control signals are generated for operation of a motor 19, via motor header 18, which controls the positioning of a damper 20. An HVAC unit 21 is controlled via HVAC control relays 17 in response to a control signal from damper control board 16. Monitor-stat 15 receives information from a real time clock 14, a zone temperature sensor 24, an outside air temperature sensor 48, a damper blade travel sensor 22, and a duct temperature sensor 23. In addition, the monitor-stat 15 transmits to and receives data from the three slave-stats 30, 31, 32 via communications bus 49.

The HVAC unit 21 supplies heated or cooled air into main duct 25 where it branches into four zone ducts 26, 27, 28, 29 and then into zones 4, 1, 2 and 3 respectively via dampers 20, 39, 40, and 41 respectively, and each thermostat 10 controls its own damper. Slave-stat 30 sends a signal to damper control 33 to operate a precision stepper motor 36 which in turn positions damper 39. Slave-stat 30 receives data from a zone temperature sensor 45, duct temperature sensor 42, and travel limit sensor 22a. Slave-stats 31 and 32 and their associated devices and sensors are not directly controlled but are somewhat interrelated with such devices employed in zone 1 with slave-stat 30 via monitor stat 15.

The monitor-stat 15 receives data from sensors 23, 22 and 48 via a damper control board 16. As will be discussed in more detail below, the damper control board 16 has circuitry for enabling several analog sensors which then send their signal data to the monitor-stat 15 or to slave-stats 30, 31, 32. Additional sensors, while not fully described herein, may include devices for the measurement of, for example, air pressure, air velocity and humidity.

Only the monitor-stat 15 includes a control function of the HVAC unit 21. The monitor-stat 15 receives data from its own zone and from the zones 1–3 monitored and controlled via slave-stats 30, 31, 32 respectively. In addition, the monitor-stat 15 has the real time clock 14 and data representative of the time-of-day and day-of-the-week is sent to each slave-stat 30–32 in the system from the monitor stat 15, as will be more fully explained hereinbelow.

As will be more fully explained below, a given monitor-stat 15 can itself be controlled by higher intelligence such as a computer system (not shown). Communication line 49 represents the communication network between the monitor-stat 15 and slave-stats 30–32.

Figure 3:
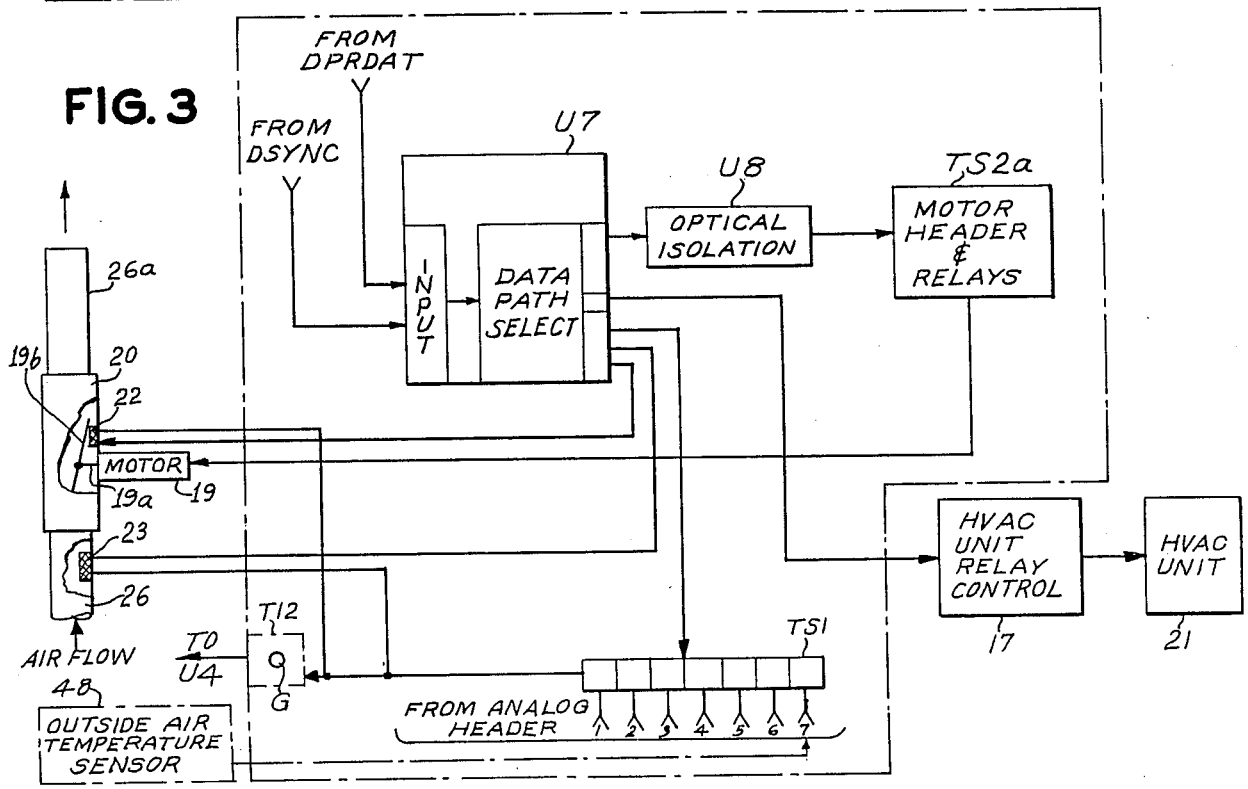
FIG. 3 is a simplified schematic diagram of the damper control board and associated devices in accord with this invention.

Referring now to FIGS. 3, 4, schematic diagrams of the thermostat 10 are illustrated. The thermostat electronics comprise a conventional microcomputer U1 clocked at 6 Mhz by way of crystal Y1 and capacitors C1 and C2. U1 has interal memory that is supplemented by programmable logic circuits consisting of a 256-bit electronically erasable programmable read only memory (EEPROM) U2 and read only memory (ROM) U3 which contains instruction codes and fixed data. U2 and U3 will be more fully explained hereinbelow.

General Purpose Interface (GPI) U4 provides for a number of interface circuits including a serial asynchronous receive/transmitted (SART), a 10-bit A/D converter, a liquid crystal display driver, and other logic circuits which are combined in a 68-pin integrated chip for many reasons including space, expense, and reliability. The circuits in U4 are of conventional design and a functional block diagram of the GPI U4 is shown in FIG. 6.

In the preferred embodiment of the thermostat 10, GPI U4 and microcomputer U1 are connected by thirteen lines: 8 data lines; an address latch enable (ALE); a write control ($\overline{WD}$); a read control ($\overline{RD}$); a reset line; and a clock output supplying 2 Mhz to U4.

U4 receives analog temperature data from a zone temperature detector or sensor such as 24. Each of sensors 24, 45, 46, 47, which can be located at the thermostat 10 or at a remote location in the zone, are a current source with a 1.0 ua/°K output which is received by the A/D converter in U4. The data is then sent to U1 in digital form. Each of the sensors 24, 45, 46, 47 is enabled via a respective signal from its U1 in response to control algorithms in U3 and is sent to U4 at input "CH0" (channel 0).

As discussed above the thermostats 15 and 30–32 control respective damper 20, 39, 40, 41 by way of a precision stepper motor 19 and 36–38 and thermostat 15 activates and deactivates an HVAC 21 via control relays 17. U1 transmits an 8-bit command word into U4 where it is framed to an 11-bit word and transmitted to the damper control circuitry 16 and 33 by synchronous transmission. The transmission is clocked by way of division of the 2 Mhz clock signal received from U1 down to 9600 Hz. As explained below, the damper command word contains information which can be used to select analog signals located on the damper control board 16 or 33 for A/D conversion in U4 and also for control of a HVAC unit 23.

The monitor-stat 15 has provision for physically mounting a real time clock 14 in the housing 11. If this option is desired, a housing cover 12 will have the cutout portion 14a for viewing the integral display face of the clock 14.

The damper control board 16 is illustrated in FIGS. 3, 7 and 8. U7 receives a synchronizing signal (DSYNC) and the damper control word (DPRDAT) from U4 via T8, T9 and TI1. An input shift register 55 directs the word to data path select logic 56 where it is directed to HVAC unit control 17; motor control TS2 or sensor select enabling circuitry TS1. The sensor select circuitry 57 is used to enable one of several analog sensors, such as outside air temperature detector 48 and others, such as, air pressure and humidity (if available). The sensor select 57 is not needed to enable duct temperature sensor 23 and damper travel limit sensors 22, 22a, 22b, 22c. The travel limit sensor 22 is a digital Hall effect device that provides an output when the damper blade 19b is at its maximum travel limit and another output when the blade is at any other position. Duct temperature and travel limit data are constantly monitored by each thermostat. The sensor select logic 57 is used to select which of the optional analog detectors, such as outside air temperature sensor 48, will be enabled. Sensor select 57 is responsive to data contained in the 8-bit damper command word. The selection between damper motor control logic 58 and HVAC relay control 17 is also based upon data in the damper command word. For reliability, the circuitry also has various watchdog and hardware redundance functions relating to hardware functioning and input clock signal integrity. Data verification logic 62 works in conjunction with latches 57, 60, 61 to provide a check of hardware redundancy. Input clock timeout 62, input data timeout 63 and reset logic 64 circuits are used with signal monitoring and reset functions.

Damper control board 16 includes opto-isolation U8 for the motor control relays to isolate inductive transients in the circuitry by isolating control power from operating power. The motor header TS2 is fed via hex inverter U9. TS2 and U9 are combined in TS2A for simplicity of illustration in FIG. 3. U7 is clocked at 48 Khz from oscillator A3. The two other amplifiers A1 and A2 in U7a are part of the U7 monitoring system, including power supply availability. Terminal "G" on TI2 provides analog sensor data to the U4 A/D converter. As is understood in the art, electrical circuitry, associated with relays must be designed to eliminate noise and signal transients associated with relay operation such as inductive kick, contact bounce, and the like. In addition, AC signal noise must be eliminated from analog sensor signal lines. Accordingly, isolation resistors and capacitors are used throughout the circuitry, as is the case with most electronic design. Also, in the preferred embodiment of the present invention, TS3 has terminals for supplying power of additional circuits. The design approach is to supply line power to the damper control board 16 which in turn supplies the various controls used in the system via relay boards that are tailored for a specific application (e.g. single zone; multiple zone, etc.).

The real time clock 14 is illustrated in FIG. 9. The real time clock circuitry U11 contains an input from a crystal oscillator Y1 (see FIG. $5_3$) and the necessary counters, latches and so forth. Clock controller U1D reads data from U11 in response to time data request signals from microcomputer U1. The data is framed from 8-bit to 10-bit words for transmission to U1. U10 also supplies data continuously to display driver/decoder U12 where it is directed to liquid crystal display U13 for visual readout. Switches S10 and S11 are used for setting the clock controller U10 to a reference time during start-up of the system. In the preferred embodiment of the invention, capacitor C48 is a large (0.1 f) capacitance to supply U11 during power failures. "Clock Reset" is used in the time-of-day (12-hour AM/PM) and day of the week reset functions via a signal from U1.

The present invention employs the concept of firmware engineering in the design of the thermostat 10. The basic approach is to build a single thermostat 10 that can be used with other devices in a master-slave relationship. One thermostat 10 is chosen as a master or "monitor-stat" 15 and the others are "slave-stats" 30–32. The thermostat 10 has control algorithms or programs in U3 for purposes of, among other things, transmitting and receiving data from other thermostats 10 or devices. In addition, and quite importantly, this design allows a monitor-stat 15 to operate a single zone HVAC unit 21 in a single zone mode of operation where zoning is not required and to control a damper 20 based upon information associated with its own zone in a multiple zone system.

A description of the programming and operation of the thermostat 10 will illustrate the unique features of the present invention.

PROGRAMMING THE THERMOSTAT

1. Zone Number

In order for a monitor-stat 15 to communicate with one or more thermostats 10 functioning in a slave capacity as slave-stats 32, it is necessary to establish the identity of any given thermostat 10 or device so that data can be associated with a given device.

The zone number of the thermostat 10 is established by way of S1–S4 and S5. S5 is a 16-position rotary switch which supplies a 4-bit binary coded decimal word to the input bus of U4. The use of a BCD word and switches S1–S4 allows for the creation of an 8-bit input word. The normal position of S5 is "0". With S5 in position "1", the zone number will be displayed on display 13. S1 can be used to raise the number, S2 can be used to lower the number. The monitor-stat 15 in any given application is always given the highest number as a matter of firmware design. The zone number is placed in EEPROM U2 via U1.

2. Single Zone or Multiple Zone Mode

The thermostat 10 can be used for a single zone thermostat or it can be used as the monitor-stat 15 in a multiple zone mode that employs a number of slave-stats 30–32. When S5 is in position "1" the display 13 will be illuminated with the word "ON" or "OFF". When the display 13 shows "OFF" the thermostat 15 is in the single zone mode and does not require data inputs from other devices in order to control the given zone. When the display 13 indicates "ON" the thermostat 10 is enabled for use as the monitor-stat 15 in a multiple zone system. Either of switches S3 and S4 can be used to toggle the function on or off. When the multiple zone mode is enabled ("ON"), firmware via U3 is used to control the system based upon data received from other sources. In either case the monitor-stat 15 is responsive to its own data being supplied by its own sensors.

3. Program Periods

A monitor-stat 15 has the capability of receiving data from a real time clock 14 by way of pins on U1. As far as the system operation is concerned, U3 instruction codes divide time into two categories. First is Period I and Period II which represent days of the week. With S5 in position "2", switches S1 and S2 can be used to raise or lower the number associated with the beginning day of Period I. Each day of the week has been assigned a number beginning with Monday=1 and ending with Sunday=7. The display 13, with S5 in "2", will show the beginning and ending day of Period I. S3 and S4 are used to set the ending day. Thus, a "2" and "6" displayed indicates that Period I is Tuesday through Saturday. The instruction codes automatically establish Period II as the remainder of the week (i.e., Sunday through Monday). A slave-stat 30–32 receives real time data from the monitor-stat 15. A slave-stat 30–32 also has time period programming identical to monitor-stat 15.

The second category of time is the time of the day. This feature employs the use of RAM in U1 and will be discussed hereinbelow.

4. Celcius/Fahrenheit Data Display

A relatively straightforward algorithm is used to allow the display to present data in either °C. or °F. The display 13 will alternate between "F" or "C" when S1 or S2 is depressed with S5 in position "3".

5. Set-up/Set-back Setpoints

In many applications it is desirable to establish heating and cooling setpoints for occupied conditions and have different setpoints for times when the zone is not occupied. Set S5 to position "4". The cooling set-up setpoint will be displayed when S1 is depressed to raise the cooling setpoint to 1° F. greater than the 66°–80° F. range set in U3. Thus, raising the cooling setpoint to 81° F. with S5 in "4" will display the set-up setpoint which can then be adjusted to any point between 81°–96° F. Similarly, adjusting the heating setpoint to below 66° F. will display the heating set-back setpoint which can be adjusted using S3 and S4 to between 50°–65° F. The programmed set-up/set-back setpoints are used in conjunction with firmware and are necessarily time dependent as will be described hereinbelow.

6. Zone Temperature Calibration

With switch S5 in position "5", switches S1 and S2 can be used to adjust the calibration of the A/D circuitry which receives signals from zone sensors 24, 45–47. The calibration is accomplished using a reference thermometer. The A/D circuit supplies a 10-bit word for the temperature (2 bits for the most significant bit, MSB, and 8 bits for the least significant bit, LSB). A 2-bit calibration word, 1 bit for MSB, 1 bit for LSB, is entered in the U2 EEPROM for use in modifying the temperature word so that the temperature reading on the display 13 is the same as that read on a reference thermometer. This data is provided to U4. A calibration word placed in U2 will modify the A/D output signal representative of temperature so that the exact temperature will be used in the circuitry. The calibration word is modified by S1 and S2 until the temperature displayed on display 13 is the same as that on the reference thermometer.

7. Duct Temperature Calibration

The system employs duct temperature sensors 23, 42–44 upstream of the dampers 21 and 37, respectively. With S5 in position "6", S1 and S2 can be used to calibrate duct temperature in the same manner as utilized in zone temperature calibration.

The technique utilized in the calibration of zone and duct temperature can be used with any analog sensor supplying an input to U4 with the addition of appropriate programming of U2 calibration words and instructions.

8. Ventilation and Maximum Damper Positions

The monitor-stat 15 receives data by way of driver U5 and GPI U4 SART. As will be explained in more cetail below, the monitor-stat 15 determines whether the system (the HVAC unit 21and the dampers 20, 29–41) should be in a heating or cooling mode by analyzing the demand for heating/cooling in each zone. This demand is defined as the difference between the zone setpoints and actual zone temperature. If there is not sufficient demand for heating or cooling the dampers 20,39–41 are placed in "ventilation" mode. Set S5 to "7" and the damper ventilation mode position data will be displayed on display 13. Switches S3 and S4 are then used to set the damper 21, 37 from 0% open (Display="0") to 50% open (Display="7").

Also in position "7", the maximum open position of the damper 20, 39–41 can be adjusted using switches S1 and S2 between 100% open (Display="15") to 50% open (Display="8").

9. Setpoint Lock/Override

A unique feature of the present invention is the ability to lock the zone temperature setpoints via the system firmware. With S5 in "8", either S1 or S2 can be depressed to alternate the words "ON" or "OFF" on display 13. When "ON" is displayed at the monitor-stat 15, all zone temperature setpoints on slave-stats 30–32 are locked as set. "OFF" allows zone temperature setpoints to be adjusted at each of the slave-stats 30–32.

The slave-stat 30–32 also has provision for override of the locking feature of monitor-stat 15. By placing the slave-stat switch S5 in position "8", depressing S1 and S2 will cause the words "ON" or "OFF" to be alternately displayed at the slave-stat 30–32 and when "ON" appears, the lock feature of monitor-stat 15 is overridden at the particular slave-stat 30–32.

10. Local Setback Control and Time-Of-Day Program

Set switch S5 to position "9". The pressing of either S1 or S2 will alternate the words "ON" and "OFF" on display 13. When "ON" is displayed, a slave-stat 30–32 will operate on its own programmed set-back times. When "OFF" is displayed, a slave-stat 30–32 will operate on the setback times of the monitor-stat 15.

For the monitor-stat 15 the use of "ON" results in the monitor-stat 15 following its own set-back times as might be the case when the monitor-stat 15 is in a single zone control mode. When "OFF" appears, the monitor-stat 15 will follow time commands from another device such as a computer command center, or other device such as another monitor-stat 15.

With switch S5 in "0" the set-back times can be programmed. Program switch S6 is depressed and fan switch S7 can be placed in "auto" to represent period I (as programmed earlier, see 3. *Program Periods,* above). Now, if both S3 and S4 are depressed simultaneously, the last program (stored in U1) will be erased. Switch S1 is used to advance time. "ON" will be displayed in the upper left hand corner of display 13. "AM" will be displayed in the lower right hand corner. Time is advanced, hourly, until the desired hour is displayed. Either switch S3 or S4 can be depressed to indicate "OFF" S1 can then be depressed to display the time of day that setback should occur. The thermostat 10 is now programmed to follow the cooling/heating setpoints between the "ON" and "OFF" times and revert to the cooling set-up/heating set-back setpoints as previously established at the "OFF" time, i.e., when the comfort or occupied function is "OFF" the set-back feature is operative.

If switch S3 is now depressed, the word "ON" will appear and a second set-back time period can be programmed as before. Depress program switch S6 and the Period I setback times are entered.

To program for Period II, set S7 to "ON" and depress S6. Period II set-back times can now be programmed as were Period I times.

U1 in the monitor-stat 15 can receive real time data via pins P15 and P16. In addition, the use of control algorithms and switches S1–S4 and S5, S7 allows for the creation of distinct time periods: (1) Period I and Period II having to do with the days of the week; and (2) at least two distinct time periods of a given day. With the use of the real time data, the desired temperature becomes time dependent as it is now associated with a given time period. A slave-stat 30–32 receives real time data via communications bus 49.

11. Information Display

With S5 in position "A", S1 and S2 can toggle "ON" or "OFF" the Information Display option. If the display 13 is "ON" then, when both S1 and S2 or S3 and S4 are simultaneously depressed with S5 in "0" (Normal), the room temperature will be displayed (as usual) followed by time-of-day (if available), duct temperature and damper position (desired/actual), in that order. In addition, air pressure and air velocity in the ducts 26,27,28,29 can be displayed if the appropriate sensors are installed.

12. High/low Temperature Limits

The rotary switch S5 is placed in position "B". Depressing either S1 or S2 will alternate the words "GE" (for Gas/Electric) or "HP" (for Heat Pump) on display 13. The monitor-stat 15 is programmed to automatically shut down the first and/or second stages of heating or cooling if certain temperature limits are exceeded. The trip points are different for Gas/Electric or Heat Pump applications. Selection of "GE" or "HP" depends upon the type of HVAC unit 21 used.

Either switches S3 and S4 can be used to alternate "ON" or "OFF" to allow the High/Low temperature trip points to be turned on or off. The monitor-stat 15 constantly receives, preferably every 20 seconds, duct temperature data from all zones via the slave-stats 30–32. A single High or Low duct temperature reading is sufficient to activate the setpoint trip.

13. Outside Air Temperature

In systems using heat pumps it is desirable to limit set-back when outside temperature gets too cold because heat pumps become inefficient at low temperatures. Electric resistance heating can be used but is expensive. Accordingly, it might be advisable to override set-back when recovery from the set-back temperature requires electric resistance heating because the heat pump is inefficient at the given air temperatures.

In the preferred embodiment of the invention the monitor-stat 15 will override set-back when an optional outside temperature sensor 48 indicates 30° F. or lower.

The enabling or disabling of the outside air temperature sensor function is accomplished by placing S5 in position "C" and pressing either S3 or S4 to toggle "ON" or "OFF" on the display 13.

14. System Demand

The monitor-stat 15 receives information from the slave-stats 30–32 every 20 seconds. Data received includes the heating/cooling setpoints and zone temperature. Sufficient zone demand to activate the HVAC unit 21 is defined as any zone having a temperature more than 1.5° F. from the setpoint (in the appropriate direction). The monitor-stat 15 will place the system in a heating or cooling mode depending upon the number of zones indicating sufficient zone demand. With S5 in position "C" the system demand number is displayed. Switches S1 and S2 can be used to adjust between 1 and 4 zone demands needed to establish system mode.

15. Communications Check

With S5 in position "D", the depressing of S1 or S2 will initiate a communication check between each slave-stat 30–32 and the monitor-stat 15. The zone number of each slave-stat 30–32 will be momentarily displayed along with a data word indicating whether the slave-stat 30–32 is a "cooling caller"; "heating caller"; a "cooling" or "heating" reference; or has a specific demand. The system status will be explained below in the System Operation.

16. Supplementary Heat

For a number of reasons usually dealing with the specific building construction and location, supplementary heat such as baseboard heaters might be desirable. With switch S5 in position "E", switches S1 or S2 can be used to toggle the option "ON" or "OFF". Supplementary heat works in conjunction with an outside temperature sensor 48 in a special mode of operation that need not be further discussed herein.

17. Time Guard Override

This feature involves S5 in position "F" and the toggle "ON" or "OFF" of a function to override a built-in time delay associated with cycling of the HVAC unit 21.

As can be understood from the above descriptions of the programming of the thermostat 10 and the electronic circuits involved, the approach that is used in design of the thermostat 10 allows for maximum capability of the system in which it is used. Further, the thermostat 10 needs only switch connections S8 and S9 to enable heating and cooling control in the master or monitor-stat 15 function. The programmable logic of U2 and U3 supplies the fixed data and instruction for operation of U1 as a monitor-stat 15 or a slave-stat 30–32 with the associated programmed operations.

The monitor-stat 15 controls both a damper 20 for its zone and the HVAC unit 21 supplying the system. U1 generates an 8-bit damper command word which is modified for synchronous transmission by GPI U4. In the preferred embodiment of the invention, the most significant bit (MSB) of the damper command word is different for (1) control of damper 21 or (2) control of HVAC unit 21. Switches S8 and S9 provide data inputs into U1 to assist in the creation of a MSB of the damper command word that is recognized by control circuitry 16 as that associated with the damper 20 or the HVAC unit 21. Referring now to the detailed schematic of FIG. 5 the operation of the thermostat 10 will be described more fully.

System Operation

The heating and cooling setpoints are entered into the memory of U1 via switches S1–S4 and S5 and GPI U4 as discussed above. Actual temperature in the zone associated with the thermostat 10 is derived from sensors 24, 45–47 and can be read by manually simultaneously depressing S1–S2 or S3–S4. Instructions derived from U3 will cause data representative of the actual and desired temperatres to read into U1. A comparison of the two temperatures results in the creation of a signal representative of the demand for heating or cooling or no demand in the zone. Instructions in U3 in the monitor-stat 15 predetermines that a 1.5° F. or greater difference between actual and desired temperature is necessary before there is sufficient demand to generate the signals for operation of the system in the heating or cooling mode by activating the HVAC unit 21. If there is sufficient demand, U1 will generate an 8-bit damper command word which is sent to U4 via the 8 data bus lines. The 8-bit word is framed to 11 bits for synchronized transmission to the damper control circuitry 16. The MSB of the word is recognized by the control circuitry in damper control board 16, 33–35 as being for operation of the damper 20, 39–41. After a time interval of, for example, 30 seconds which is established by code in U3, the damper command word is modified to have a MSB that is recognized by the control circuitry as being for operation of the HVAC unit 21. As before, the damper command word is transmitted to the damper control circuitry 16 which can operate the HVAC unit control circuit 17. As mentioned above, U3 code includes control algorithms for operating either a Gas/Electric or heat pump as programmed. This feature sets temperature limits for safe operation of the system and proper levels of additional heating or cooling as appropriate.

If the HVAC unit is not energized, U1 in the thermostat 10 compares actual temperature in the zone with duct temperature. The duct temperature sensors 23, 42–44 are located adjacent the inlet of the dampers 20, 39–41 supplying air to a given zone. In the preferred embodiment of the invention, the duct temperature sensors 23, 42–44 send a signal to circuitry associated with damper control boards 16, 33–35. This data is received by U4 on Channel 1 (CH 1) along with other information that is deve-oped remotely. This data undergoes A/D conversion as does the zone temperature from sensors 24, 45–47.

If the duct temperature is lower than actual zone temperature the thermostat 10 will operate the associated dampers 20, 39–41 in the cooling mode. If the duct temperature is above the actual temperature, the associated dampers 20, 39–41 are operated in a heating mode. That is to say, the dampers 20, 39–41 are operated as though the HVAC unit 21 was supplying the hotter or cooler air. Consider the case where actual temperature is below the heating setpoint with duct temperature also below the actual temperature: A. the particular zone has demand for heating but is in the cooling mode; B. accordingly, the dampers 20, 39–41 are closed; C. however, if the duct temperature was above the actual temperature, i.e., heating mode, the damper 20, 39–41 will open proportionally to the level of demand as computed by a comparison of actual zone vs. setpoint temperatures.

If the demand for heating or cooling is 1.5° F. or greater, the monitor-stat 15 will activate the HVAC unit 21 as desired. A damper command word is generated, for example, cooling, and the dampers 20, 39–41 are placed in the cooling mode regardless of the duct temperature comparison discussed above. If the zone has an actual temperature below the heating setpoint, the dampers 20, 39–41 will be closed in anticipation of activation of the HVAC unit 21 in the cooling mode. If the actual temperature is above the cooling setpoint, the dampers 20, 39–41 will be positioned open. U1 in monitor-stat 15 now generates an output damper command word for activating the HVAC unit 21 in the cooling mode.

If the monitor-stat 15 is operating in the multiple zone mode, instruction codes in U3 will not generate the damper command words for operating the dampers 20,39–41 and HVAC unit 21 unless the number of zones with 1.5° F. or more demand in a given mode is equal to or greater than the system demand number that has been selected as discussed above.

The monitor-stat 15 also uses duct temperature directly to determine if additional stages of heating or cooling are required in a given mode. For example, if duct temperature is not below 55° F. when the system is in a cooling mode, the damper command word will contain information that will cause HVAC control circuitry 17 to energize an additional stage of cooling. The additional heating or cooling functions derive from codes in U3. Finally, duct temperature is used directly for high/low temperature trips of the HVAC unit 21 for safe system operation.

1. Communications

In the preferred embodiment of the present invention, the SART in GPI U4 is used for communication with peripheral circuits. Input data from the SART and data switches S1–S4 and S5 is placed in registers in U4 which can be read by U1. U4 also contains an 8-bit address bus for accessing microcode in U3.

Collision avoidance for the communications network 31 is accomplished by load resister R6 which monitors the current required by line driver U5. Q3 is turned on by line current through R6 and an Interrupt ($\overline{\text{INT}}$) signal is placed on pin 6 of U1. Capacitors C5 and C6 filter noise which might otherwise result in false collision detection indications.

2. Watchdog Functions

U4 also performs watchdog functions to insure proper operation of the thermostat 10. A voltage divider of R15 and R16 applies a signal to pin 57 of U4. When and if the voltage is too low, U1 is disabled by a signal on the reset line between U1 and U4. U4 also receives timing data from U1. If the proper timing data is not received, U1 will be disabled via the reset line.

3. Digital Functions

An important feature of the thermostat 10 is the exclusive use of all data in digital form. For example, the heating and cooling setpoints are entered into U4 by switches S1–S4 and S5. The SART in U4 also places incoming information on the same registers used for setpoint input. As mentioned above, firmware in conjunction with the programming allows for setpoint lock from the monitor-stat 15 to a slave. Further, there is provision at the slave-stat 30–32 for override of the remote setpoint lock feature. This is made possible by the use of digital data format.

Also, analog temperature data is converted into digital form in the A/D converter in U4. The digital form allows for calibration of the data by way of the software because each temperature interval is a binary word. A calibration binary word can be placed in U2 for calibration using S5 in position "5" or "6". Similarly, other remote data can be accessed by the thermostat 10. Data in analog form can be enabled via the instruction codes and converted to digital form in U4. For example, in the preferred embodiment of the thermostat 10, various analog data is accessed by way of the damper control circuitry 16, 33–35. By modification of the damper command word, different remote data can be enabled and received at CH 1 of U4. Because the enabling was done via U1 command word generation, the incoming data is easily identified and properly processed.

The use of digital data allows for the transmission of any information at a thermostat 10 to any higher intelligence as well as the reception of data for processing and control. Also, the thermostat 10 has internal diagnostics and system failures can be identified by data presented on display 13. For example, failures having to do with the setback setpoints is identified as "SF 2". A hardware failure might be "HF 16": zone temperature sensor out of range.

Finally, real time data can be received by monitor-stat 15 in digital form. This data can be transmitted by way of U4 SART for supplying data representative of time to other peripheral circuits such as a slave-stat 30–32. This function is used in the set-up/set-back setpoints and time periods as discussed above. Also, because of the digital nature of all data, the time inputs may be simply "ON" or "OFF" signals derived from an electromechanical timer using simple relay contacts that are either opened or closed at a given time.

Liquid crystal display 13 is a conventional tri-plexed display driven by U4 and used for local indicating means for data display.

If the monitor-stat 15 has been programmed for multiple zone use, the level of demand from each zone is read by receiving the actual deviation of room temperature from setpoint temperature. In the preferred embodiment of the invention, all thermostats 10 are specifically designed to compute the level of demand rather than simply exchange a "YES" or "NO" signal. This feature allows the monitor-stat 15 to compare the level of demand in each zone and select the zone with the greatest demand as the reference zone. Other thermostats 10 are heating "callers" or "cooling callers" if demand for heating or cooling exists in the given zone. The thermostat 10 will operate the HVAC unit in the appropriate mode until the reference is within 0.5° F. of the setpoint. For example, the system demand number may be "3" thus requiring 3 zones to have a similar demand for heating or cooling before the heating or cooling mode is selected but the mode once selected will remain in effect until the reference zone is satisfied. A new reference zone will be chosen if a zone develops a greater demand than the first reference during operation in a given mode.

Once the reference zone is within 0.5° F. of the setpoint, the monitor-stat 15 will generate the appropriate damper command word to deactivate the HVAC unit 21 via HVAC control circuit 17. Assume that cooling was being supplied and the HVAC unit 21 is deactivated. The duct temperature at each zone will be below actual temperature. Thus, the comparison between duct and zone temperature will result in the monitor-stat 15 placing its damper 20 in the cooling mode. As a matter of design, each slave-stat 30–32 will also position its damper 39–41 in the cooling mode.

With the HVAC unit 21 deactivated, duct temperature will gradually increase. If duct temperature rises above zone temperature, the thermostat 10 will operate its damper in the heating mode. As a matter of design, the heating and cooling setpoints are established by U3 to be within 65°–80° F. If duct temperature is within the range 65°–80° F. and there is no demand or demand different from the mode created by the duct/actual comparison, the dampers 20, 39–41 placed in the ventilation mode. In the above example, where cooling was being supplied, the dampers 20, 39–41 will remain in the cooling mode because actual temperature will probably be above the cooling setpoint due to the ambient heat sources that caused temperature to increase in the first place.

In the preferred embodiment of the present invention, power is directed to a thermostat 10 from its respective damper board 16, 33–35 via a 12- conductor ribbon having terminals T1–T12 for power input and communications therebetween. Voltage regulator U6 is a conventional device for supplying a regulated +5 vdc to various circuit points. Another voltage of +9.3 vdc is also supplied from damper boards 16, 33–35. As is understood in the art, the completed circuit illustrated in FIG. 5 comprises filter capacitors and resistors for signal isolation and noise suppression and the like. Terminals T11 and T12 are the connection points used if zone temperature sensors 24, 45–47 are located in the zone instead of physically connected to the housing 11 of the thermostat 10. Transistors Q1, Q2 and associated components are used to enable the sensors 24, 45–47.

In accordance with the present invention the thermostat 10 can be used in the capacity of a monitor-stat 15 which essentially controls the system with a number of slave-stats 30–32 or as a monitor-stat 15 which is controlled by higher intelligence. The monitor-stat 15 controls its own zone conditions and the conditions in each other zone is controlled via a slave-stat 30–32. Each thermostat 10 operates dampers 20, 39–41 in the ducts 26–29 that directs air into the zone. The monitor-stat 15 can also control an HVAC unit 21. Importantly, the monitor-stat 15 can operate in a single zone mode without a damper 20 by simply controlling the operation of an HVAC unit 21.

The major distinctions between a thermostat 10 used as a monitor-stat 15 and as a slave-stat 30–32 are (1) the monitor-stat 15 has the instruction codes and data in U3 for operation as a master controlling device; (2) the monitor-stat 15 has provisions for a real time clock input data and the programming to make use of such data; (3) the monitor-stat 15 has heat switch S8 and cool switch S9 for operation of an HVAC unit 21; and (4) the monitor stat 15 has additional programming capability due to codes stored in U3. These features allow the monitor-stat 15 to receive, process and transmit information to one or more slave-stats 30–32. In addition, the monitor-stat 15 can receive and transmit information to higher intelligence. Thus, a plurality of monitor-stats 15 each associated with its own HVAC unit 21 and a group of slave-stats 30–32 may be under control of a central computer system. Furthermore, because a monitor-stat 15 can operate in a single zone mode as well as in multizone mode, there is virtually unlimited flexibility in overall system design for use of such thermostat 10.

The features of the thermostat 10 used respectively as a monitor-stat 15 and a slave-stat 30–32 are as follows:

Each thermostat 10 is programmed for zone number; programming periods; °C. or °F. display; set-up/setback setpoints; calibration of zone temperature sensor; calibration of duct temperature sensor; and damper travel limits/ventilation mode travel limits. The monitor-stat 15 can be programmed to lock slave-stat 30–32 setpoints; the slave-stat 30–32 can be programmed to override this lock feature. The slave-stat 30–32 can be programmed to follow the set-back times of another device or to follow setback times programmed at the slave-stat 30–32. The monitor-stat 15 may be programmed to follow its own set-back times or to follow those of a higher intelligence. The monitor-stat 15 alone has the following programmable features (1) the high/low temperature limits set in U3 are made operational by establishing that the HVAC unit 21 in use is Gas/Electric or Heat Pump; (2) the system demand number; (3) the communication check feature; and (4) the supplemental heat/time guard override features. The monitor-stat 15 alone also has the capability to receive real time data directly and such information can be transmitted to all slave-stat 30–32 via the SART in the monitor-stat 15.

The general design of the thermostat 10 employs digital words and programming to accomplish the various tasks. The characterization of the thermostat 10 as a monitor-stat 15 or slave-stat 32 is done by way of the instruction codes in U3 and, in the case of the monitor-stat 15, the addition of "heat" switch S8 and "cool" switch S9 to U1 and the provision for a real time clock input signal to U1 from clock 14.

The system employs a first circuit subsystem comprising switches S1–S4 and S5 which provide 8-bit digital words into U4 for establishing the desired operating limits, such as temperature setpoints. In addition, switches S1–S4 and S5 are used in the programming of the thermostat 10 by providing digital words to EEPROM U2 and accessing digital words contained in U2 for use in sensor calibration; for establishing the minimum and maximum damper position in a given mode (ventilation, heating, cooling); and for establishing the applicability of the high and low temperature trips for given type of HVAC unit 21 (Gas/Electric or Heat Pump).

A second circuit subsystem receives sensor data indicative of the actual condition of the air in a zone (temperature, pressure velocity, etc.) and such data is received directly by U4 in the case of actual temperature and indirectly from the damper control circuitry 16, 33–35 with regard to duct temperature, and, if needed, air pressure, velocity, humidity, and outside air temperature. The A/D converter in U4 will provide a 10-bit digital word output that is representative of the analog data received from such sensor.

A third circuit subsystem represented by microcomputer U1, receives digital word inputs from U2 and U4 that represent programmed data and actual data with regard to the operating conditions of a given zone. U1 will provide a digital word output in response to data received from U2, U4 and its own RAM for operating the dampers 20,39–41 and, in the case of the monitor-stat 15, for operating the HVAC unit 21.

A fourth circuit subsystem represented by the programmable logic of U3 and U2 provides digital word data to U1 for controlling the dampers 20,39–41 and/or the HVAC unit 21.

In accord with this invention, there are some overlaps of the first, second, third and fourth circuit subsystems for reasons of simplicity, cost and reliability. For example, the RAM in U1 is used in programming the time-of-day associated with set-up/set-back setpoints in conjunction with S6 as a matter of convenience while EEPROM U2 is used for (1) device address/zone number; (2) standard setpoints; (3) setback setpoints; (4) open/close damper travel limits; (5) setback programs, periods I, II; (6) zone temperature calibration words; (7) various options such as (a) lock/override; (b) HVAC type; (c) temperature readout selection in °F. or °C.; and (d) local or remote setback control. This particular circuit combination allows the user to change the time-of-day associated with setback without accessing U2 via S5 and thus inadvertently altering the programs established by the installer of the thermostat 10. In the preferred embodiment of the invention, a physical barrier is placed over S5 which should be removed only by an installation technician to minimize such alterations.

In the preferred embodiment of the present invention, second temperature sensors 23,42–44 are used to measure duct temperature. The sensors are placed upstream of the dampers 20, 39–41 supplying a given zone. The analog signal is sent from the damper control boards 16, 33–35 to the A/D converter in U4 via CH 1. U4 provides a digital word output representative of the duct temperature. U3 contains instructions which cause U1 to compare the digital word received from U4 representative of actual temperature with the digital word, also from U4, representative of duct temperature. The result of the comparison in U1 is then used, in conjunction with instructions in U3 regarding mode, to determine the desired mode of operation of the dampers 20,39–41, i.e., heating or cooling. The instructions contained in U3 are written to allow time, about 30 seconds, for operation of dampers 20, 39-41 prior to activation of a HVAC unit 21. In addition, the dampers 20, 39-41 are placed in a mode coincident with that of the HVAC unit 21. Accordingly, digital words indicative of the status of the HVAC unit 21 as well as the desired status of the unit 21 (i.e., desired mode) are generated and supplied to a slave-stat 30-32 via the SART in U4. In the case of a monitor-stat 15, U1, of course, generates the desired mode digital words itself by a comparison of duct and actual temperature of its own zone for its own use in addition to transmitting the digital words to various slave-stats 30-32 via the U4 SART. The monitor-stat 15 may cause the energization of additional stages of heating or cooling if duct temperature does not reach a predetermined point within a given time interval of about 5 minutes after the HVAC unit 21 is activated in a given mode. The predetermined duct temperature limits associated with additional HVAC unit 21 stages of heating and cooling are contained in U3. HVAC unit 21 type data is contained in U2 in the form of digital words so as to allow for additional stages of HVAC unit 21 operation to be activated taking into account whether a Gas/Electric unit or a Heat Pump unit is being used in the system. Similarly, U3 contains high/low temperature trip points in the form of digital words. In the preferred embodiment of the invention, U3 in the monitor-stat 15 contains high/low trip point data to deactivate additional stages of heating or cooling: first, if a given trip point setpoint for these stages is exceeded, the entire HVAC unit 21 is deactivated; and if an additional set of high/low trip points are exceeded by operation of the units' primary stages of heating or cooling. The digital word data representative of HVAC unit 21 status thus include data regarding which of the stages of heating or cooling are energized.

U3 contains instructions for operating the zone dampers 20, 39-41 in the heating mode when the duct temperature is greater than the actual zone temperature and operating the zone dampers 20, 39-41 in the cooling mode when duct temperature is lower than actual zone temperature. Instructions in the form of digital words are also present in U3 for generation of a damper command word by U1 that is sent to the monitor-stat's damper control system 16 and to all slave-stats 30-32 for placing the dampers in the mode coincident with the decision made at the monitor-stat 15 for operation of the HVAC unit 21 prior to activation of the HVAC unit 21.

U3 contains instruction codes for placing the dampers 20, 39-41 in the cooling mode, heating mode, or ventilation mode when the HVAC unit 21 is de-energized by causing U1 to compare duct temperature with actual temperature; actual temperature with desired temperature; and duct temperature with predetermined setpoints (contained in U3). Thus, as described above, if there is no demand in a given zone or a demand different than that computed by a comparison of duct and actual temperature and duct temperature is within the range 65°-80° F., the monitor-stat 15 or slave-stat 30-32 will place its damper 20, 39-41 in the ventilation mode.

Any digital word data at any thermostat 10 can be transmitted via the SART to any other device. Thus, for example, the monitor-stat 15 will receive duct temperature data from every duct temperature sensor 23, 42-44 in the system. The monitor-stat 15 receives duct temperature data directly via its own damper board 16 and the A/D converter in U4. Duct temperature data in the form of a digital word will be received from each slave-stat 30-32 via the slave-stat 30-32 SART. Accordingly, the monitor-stat 15 need not have the capability of processing a large number of duct temperature analog signals through its own A/D converter in U4, and this greatly simplifies the design and programming of a given monitor-stat 15.

The thermostat 10 employs a conventional tri-plexed liquid crystal display 13 that can display data indicative of the information contained in any digital word data used in the thermostat 10. Furthermore, the monitor-stat 15 has a display 13 and appropriate instruction codes in U3 to allow such display to provide information received from any slave-stat 30-32.

Turning now to several of the important features of the thermostat according to the invention, an important part of the operation of thermostat 10, as either a monitor-stat 15 or slave-stat 30-32, is the use of a serial asynchronous receiver transmitter (SART) contained in U4. In the preferred embodiment of the invention, the SART is similar to a universal asynchronous receiver transmitter (UART) which is restricted to only operate at a restricted number of data rates and a universal type is not needed in the particular application.

One use of the SART in a slave-stat 30-32 is the reception of a digital word from the monitor-stat 15 that prevents the temperature setpoints at the slave-stat 30-32 from being changed locally. A 2-bit word is placed in EEPROM U2 at the slave-stat 30-32 and prevents the setpoints entered therein from being altered via switches S1-S4 at the slave-stat 32. As mentioned previously, the locking feature override can be enabled locally by entering a 2-bit word into U2 via switches S1-S2 and S5 in position "8". The 2-bit words are used to enable or disable the setpoint lock feature.

In the preferred embodiment of the present invention, a monitor-stat 15 is designed to receive information from up to 63 slave-stats 30-32 without the addition of communication bus extender circuitry. Each slave-stat 30-32 sends the following information to the monitor-stat 15 at approximately 20 second intervals: zone temperature; zone setpoints for heating and cooling; zone damper position; thermostat mode (heating or cooling); zone address number; and duct temperature. (Damper position can be derived from the signal that a thermostat 10 supplies to the damper control circuitry or from damper position-indicating circuitry that need not be discussed further in this application.)

The input from a real time clock 14 is received by a slave-stat 30-32 via its SART. This is a 10-bit word. Program periods I and II are stored as data in U2 as are the setback setpoints. Time-of-day program data is stored in the U1 RAM. The 10-bit digital word representative of real time is read into U1 which accesses instructions from U3 to modify the operation of the slave-stat 30-32 in accordance with time related or programmed periods. Thus, the slave-stat 30-32 will access setback setpoints from U2 instead of the normal setpoints (also in U2) in response to the appropriate real time digital words received from a monitor-stat 15. Also stored in U2 are the digital words for local (slave-stat) or remote (monitor-stat) setback control, as discussed hereinabove.

Data is preprogrammed in U3 for providing the dedicated set-up setpoints of 81°-96° F. and the dedicated set-back setpoints of 50°-65° F. around the normal setpoint range of 66°-80° F.

The thermostats 10, whether used as a monitor-stat 15 or slave-stat 30-32 receive data from sensors, including sensors 24, 45-47 23, 42-44 in analog form, and such signals, representing zone temperature and duct temperature, are converted to digital form via the A/D converter in U4. When calibrating the temperature sensor signals, 2-bit calibration words are placed in EEPROM U2 via switches S1 and S2 with S5 in "5" (for zone temperature) or "6" (for duct temperature). S1 or S2 is depressed to raise or lower the temperature displayed at Display 13 to readout what the exact temperature is as measured by a reference device, like an accurate thermometer. Once set, the calibration words are placed in U2 and, when U1/U3 instructions call for enabling a sensor to provide temperature data, the calibration word is sent to A/D converter in U4 which modifies its output to provide a 10-bit word to U1 that is the exact, calibrated temperature. This procedure is unique in that the usual methods used for temperature calibration involve either a modification of the temperature detector's output signal or the modification of instrumentation circuitry. In the present invention, calibration is accomplished by modification of the digital word representative of the temperature data, the digital word then being sent to U1.

U3 contains a straightforward algorithm for conversion of temperature data to readout in °F. or °C. on Display 13. With S5 in position "3" S1 or S2 can be depressed resulting in the input into U4 of a digital word that is then placed in U2. U1, in accordance with the algorithm in U3, will compute temperature in °F. or °C. when instructed to do so via the word placed in U2 that was placed therein during programming.

The programs in U3 become time-dependent with proper program inputs and the addition of a real time input signal to U1 of the monitor-stat 15 via clock 14. Real time is transmitted to the slave-stats 30-32 via the SART in monitor-stat 15. The receipt of the time data is used to switch from the setback or non-occupied time periods and the normal or occupied time periods established during the original programming. In addition, the slave-stats 30-32 can be programmed to follow the setback times of the monitor-stat 15.

The thermostat 10 in accord with the present invention has instructions and fixed data stored in U3. The information is placed in U3 in the form of machine code as set forth in Apendix A for the slave-stat 30-32.

While the invention has been described with respect to certain specific embodiments, it will be appreciated that many modifications and changes may be made by those skilled in the art without departing from the spirit of the invention. It is intended, therefore, by the appended claims to cover all such modifications and changes as fall within the true spirit and scope of the invention.

APPENDIX A file: SS01_61.COD

```
0000: 04 00 FF 15 D5 E4 7D 04  09 D5 AF 23 F7 62 88 58   ......).....#.b.X
0010: F8 17 C6 28 B9 F7 81 37  72 28 19 81 A9 18 F8 03   ...(...7 r(......
0020: 6A F2 28 F6 28 18 29 A1  B8 5B 10 F8 53 8F D3 8E   j.(.(.).  .[..S...
0030: 96 33 30 D3 0E 12 3B 77  83 D0 B3-94 ED FC C6 C2   .30...;w ........
0040: 53 F8 96 C2 B8 3C F8 03  F5 E6 C2 04 4B 84 8E B9   S....<..  ....K...
0050: 02 18 F8 C6 56 18 E9 51  B8 3E F8 53 BF A0 43 80   ....V..Q .>.S..C.
0060: 04 BF A4 7D B4 00 04 BE  B8 5E 19 F8 53 3F 96 7C   ...}.... .^..S?.|
0070: B9 40 F1 53 30 C6 7C E7  E7 19 D1 A1 F8 96 C2 B9   .@.S0.|. ........
0080: 07 C4 51 B8 5A B9 35 F8  96 99 F1 37 47 61 17 C6   ..Q.Z.5. ...7Ga..
0090: B9 18 F8 F7 77 A0 C8 23  D8 07 A0 18 96 A6 11 F8   ....w..# ........
00A0: F2 A6 F1 07 07 A1 F8 F7  FE F6 AC 37 53 03 AA 77   ........ ...7S..w
00B0: 2A E7 4A 03 02 53 03 43  04 2E 53 78 4E AE FE B8   *.J..S.C ..SxN...
00C0: F9 90 C7 07 53 07 E7 03  09 A8 F8 53 EF A0 FF 93   ....S... ...S....
00D0: 4D 4F 62 64 68 83 C2 14  E1 14 E5 27 B8 44 A0 E4   MObdh... ...'.D..
00E0: 93 23 05 04 E7 23 0A B8  3E 58 C6 FE C0 A8 18 F8   .#...#.. >P......
00F0: 53 60 B8 61 B0 8C C6 FE  C8 B2 FC C8 B0 8C 93 FF   S`.a.... ........
0100: B8 39 F8 12 0F B8 55 F0  68 62 40 C6 11 C4 F1 E4   .9....U. hb@.....
0110: A3 54 CE 94 00 B2 56 F0  96 4F 18 F8 17 C8 A0 B8   .T....V. .O......
0120: 3E F8 53 7F A0 18 F8 53  E3 A0 18 F8 53 7F A0 B8   >.S....S ....S...
0130: 45 B9 08 B0 00 18 E9 33  B8 3C F8 96 EA B8 20 F4   E......3 .<.... .
0140: 8E B8 24 F5 14 95 E5 B8  3B F8 37 D2 EF 24 F3 B9   ..$..... ;.7..$..
0150: 40 F4 00 F6 EA 18 18 18  20 96 EA F0 D3 81 C6 7E   @....... .......~
0160: D3 04 C6 7E D3 07 96 EF  B8 3E F8 53 3F B9 85 F4   ...~.... .>.S?...
0170: 00 F6 EA 53 10 B3 3F 20  53 EF 40 A0 24 EA C3 F0   ...S..? S.@.$...
0180: B8 55 A0 B9 80 F4 00 F6  EA 18 F8 C8 37 F2 A9 B9   .U...... ....7...
0190: 55 F1 37 B9 39 41 92 A9  B9 82 F4 00 B8 74 F0 47   U.7.9A.. .....t.G
01A0: E7 53 80 B8 3E 40 A0 24  B1 F4 8E B8 71 F5 14 95   .S..>@.$ ....q...
01B0: E5 B8 39 F8 12 EA 53 98  AA B8 3B F8 53 02 4A AA   ..?...S. ..;.S.J.
```

```
01C0: B8 3F F0 92 CE 53 60 4A   AA F4 74 96 CE 1A FA B9   .?...S`J ..t.....
01D0: 85 F4 00 88 3F F0 92 E1   F4 74 96 E1 FF B9 8E F4   ....?... .t......
01E0: 00 F5 54 8F E5 F9 B9 90   F4 00 B8 3B F0 D2 F3 B8   ..T..... ...;....
01F0: 56 B0 01 F4 5E 96 4F C8   A0 B8 62 B0 FC C4 AB FF   V...^.O. ..b.....
0200: B8 3B F0 37 D2 B7 B8 57   F0 C6 B7 17 B8 68 A0 F4   .;.7...W .....h..
0210: B5 AA 23 31 F4 22 C6 00   B8 00 B8 3C F0 96 57 B8   ..#1.".. ...<..W.
0220: 20 44 69 B8 39 F0 12 B7   23 F2 F4 22 C6 32 B9 00    Di.9... #..".2.
0230: 44 00 B8 5D F0 96 23 23   40 54 BD E6 42 95 B6 23   D..]..## @T..B..#
0240: 44 AE D3 81 AB C6 51 D3   04 C6 44 D3 07 96 00 6B   D.....Q. ..D....k
0250: F0 18 18 18 F0 C6 59 BB   B9 FB 96 92 85 23 80 54   ......Y. .....#.T
0260: BD E6 69 95 B6 5D 27 44   7B F0 18 03 F1 F6 73 F0   ..i..]'D {.....s.
0270: F7 C6 7B F0 F7 23 E0 F6   7B 23 A0 AB B8 68 F4 76   ..{..#.. {#...h.v
0280: 96 86 FB 43 05 AB BE 32   FB C6 94 5F C6 92 BE 02   ...C...2 ..._....
0290: 44 94 BE 12 B8 68 F0 F4   B5 AA FE F4 22 B8 5E B0   D....h.. ....".^.
02A0: 00 B8 62 B0 FF F4 24 96   2E B8 62 F0 96 A5 35 B8   ..b...$. ..b...5.
02B0: 68 F4 60 96 23 44 00 23   F0 F4 22 44 B7 B8 59 60   h.`.#D.# .."D..Y`
02C0: FF B8 6C B9 68 A0 C8 B0   01 C8 F1 A8 64 B8 B8 62   ..l.h... ....d..b
02D0: B0 FC F4 CA B8 39 F0 B8   62 B9 37 37 53 02 C6 E3   .....9.. b.77S...
02E0: F1 53 F0 19 41 C6 EE 27   A0 B8 55 A8 E4 A3 97 B9   .S..A..' ..U.....
02F0: 5D F1 C6 F9 F0 96 D2 A7   83 A0 B8 58 B0 FF 83 FF   ]....... ...X....
0300: B8 3B F0 37 AB 97 52 1B   B8 3D F0 37 72 1B 83 26   .;.7..R. .=.7r..&
0310: B9 01 BA 2C D4 F5 53 F0   4A C6 21 B8 39 F0 F7 77   ...,..S. J.!.9..w
0320: A0 B8 3D F0 47 5F 17 AA   23 CE B9 FF 03 32 29 13   ..=.G_.. #....2).
0330: 00 29 EA 2C 17 AA B8 26   D4 F5 B9 00 FB 92 43 F6   .)...,.& ......C.
0340: 43 B9 10 B8 39 F0 53 EF   49 A0 B8 44 F0 F2 54 B8   C...9.S. I..D..T.
0350: 56 F0 C6 55 83 F5 34 6E   54 8F E5 27 AC AD B3 37   V..U..4n T..'...7
0360: F0 37 32 68 B9 49 F1 AC   F0 37 12 70 B9 45 F1 AD   .72h.I.. .7.p.E..
0370: F0 47 E7 53 60 B8 3F 50   C8 C6 91 D2 87 F0 5F 40   .G.S`.?P ......_@
0380: 96 85 FC 96 B9 C4 5C F0   5F 4C 96 8F FD 96 B9 C4   ......\. _L......
0390: 00 C8 FB 37 D2 9A F0 53   FC A0 F0 53 03 37 AB FC   ...7...S ...S.7..
03A0: 37 6D F6 B5 37 96 AF B8   4A B9 46 F4 AE F6 B5 FB   7m..7... J.F.....
03B0: 6C F6 8F 04 D7 FB 6D F6   85 04 D7 F4 EE F6 D3 B8   l.....m. ........
03C0: 5C B0 F8 F4 D3 E6 D4 96   D3 B8 5C F0 96 C3 27 B9   \....... ..\...'.
03D0: 5D B1 00 83 A7 89 37 F1   53 F0 B9 68 96 E0 B9 56   ].....7. S..h...V
03E0: F1 B9 6A D1 96 D3 F0 D3   06 96 CE 97 18 F0 64 CF   ..j..... ......d.
03F0: B9 47 64 F6 B9 4B AB F1   97 96 FF C9 F1 37 6B 83   .Gd..K.. .....7k.
0400: B8 3A F0 37 BA 01 12 0B   32 0B CA 27 AD AE FA F4   .:.7.... 2..'....
0410: 64 96 1D B8 53 F0 F4 84   18 F0 C8 F4 84 65 FA F4   ....S... .....e..
0420: 89 96 2A F0 F4 89 18 F0   F4 89 FE F4 89 FD F4 89   ..*..... ........
0430: FA C6 5B B8 01 B4 DA E6   88 A0 18 F8 03 FB E6 35   ..[..... .......5
0440: 27 AD AE B8 01 20 F4 84   A9 18 F8 03 FB F9 E6 45   '....... .......E
0450: FD 4E 96 88 23 02 A8 B9   53 F4 DC BA 01 55 B8 3A   .N..#... S....U.:
0460: F0 53 FC 4A A0 37 99 BF   12 87 85 54 CE F6 87 B9   .S.J.7.. ...T....
0470: 6A B1 F1 19 B1 03 19 B1   42 19 B8 53 23 02 F4 DC   j....... B..S#...
0480: F4 EE E6 87 95 B6 6B 83   89 40 BA 00 84 5D B8 3A   ......k. .@...].:
0490: F0 53 F8 AB B8 41 F0 AA   18 B9 F0 FB 72 DB 37 32   .S...A.. ....r.72
04A0: C1 C8 F0 E7 47 53 40 2A   F7 2A F7 77 A9 F0 53 80   ....GS@* .*.w..S.
04B0: 49 A9 B8 39 F0 77 77 53   02 49 B9 F2 91 19 B8 43   I..9.wwS .I.....C
04C0: CB F8 47 A0 53 0F 03 DD   A3 2A F7 2A F7 77 2B 97   ..G.S... .*.*.w+.
04D0: A7 F7 2B E6 D7 53 80 91   19 84 9B 04 C2 3F 06 5B   ..+..S.. .....?.[
04E0: 4F 66 6D 7D 07 7F 67 39   79 71 3D 76 73 B8 5E F0   Ofm}..g9 yq=vs.^.
04F0: DD B2 FB B8 FA 23 03 90   18 27 90 83 FF FF FF FF   .....#.. .'......
0500: B8 F6 76 16 B5 FD F7 B9   33 F6 0D B9 31 F1 C8 90   ..v..... 3...1...
0510: 18 19 F1 F7 77 90 80 F2   7C A5 FD F2 2A 43 80 AD   ....w... |...*C..
0520: 8A 10 FE 53 07 AE B9 22   A4 53 FE B2 4B 92 44 72   ...S..." .S..K.Dr
0530: 3D 43 08 AE 80 53 40 2D   53 BF 4D AD 83 83 09 AE   =C...S@- S.M.....
```

```
0540: B9 24 A4 53 43 38 AE B9   26 A4 53 9A EF FD 53 7F   .$.SC8.. &.S...S.
0550: AD B9 28 27 AA BB 03 97   F7 2A F7 2A 61 19 2A 71   ..('.... .*.*a.*q
0560: 2A C9 EB 57 AB C8 80 6B   AB 18 80 53 07 7A BA 03   *..W...k ...S.z..
0570: 97 67 2B 67 2B EA 70 2B   A1 19 FB A1 83 89 1F BA   .g+g+.p+ ........
0580: 1F FD 53 E8 A9 09 37 5A   49 2D DD 5A 96 D8 B8 FC   ..S...7Z I-.Z....
0590: 80 ?? 47 2C DC 96 D8 FD   53 0F A9 FC 53 F8 49 E8   .?G..... S...S.I.
05A0: 37 ?? FC 53 0F A9 FD 53   18 49 A9 18 F8 5A A8 5A   7..S...S .I...Z.Z
05B0: 30 BB 80 F9 5A 96 C5 F0   5A C6 C5 FA 37 53 0F 59   0...Z... Z...7S.Y
05C0: 96 C5 F0 4B A0 FB 77 AB   FA 77 77 AA 37 F2 83 F9   ...K..w. .ww.7...
05D0: 40 A0 03 A8 27 67 40 A0   04 C2 BE 00 09 37 B2 E4   @...'g@. .....7..
05E0: EE DC 97 83 BE 11 EE E6   BE 80 09 47 67 67 FE 67   ........ ...Ggg.g
05F0: BE 09 EE F2 AE E6 EA 09   B2 FB 97 FE 83 FF FF FF   ........ ........
0600: B8 32 F0 77 77 53 20 43   DC B8 3E 50 A0 B9 40 F1   .2.wwS C ..>P..@.
0610: 92 13 27 AA 37 52 1B 14   E1 04 E5 13 05 74 F4 E6   ..'.7R.. .....t..
0620: _  ?? ?? ?? 74 F4 F6      4B 23 40 F4 93 96 5B F8   =..?.t.. K#@...[.
0630: 52 39 B9 61 F1 96 5B B1   D1 B9 34 F1 37 77 47 B9   R9.a..[. ..4.7wG.
0640: 3B 41 47 77 77 53 10 43   04 40 A0 FA 72 1F 23 14   ;AGwwS.C .@..r.#.
0650: 74 F4 F6 5B 00 00 00 00   00 F4 48 93 B8 3E F8 53   t..[.... ..H..>.S
0660: F3 A0 B9 40 F1 82 68 27   AA 37 12 70 14 E1 04 E5   ...@..h' .7.p....
0670: 23 05 74 F8 E6 79 04 D7   23 0F 74 F8 F6 9A 23 28   #.t..y.. #.t...#(
0680: F4 93 96 AA F0 12 8E B9   61 F1 96 AA B1 D1 69 32   ........ a.....i2
0690: F1 37 77 77 43 11 53 31   40 A0 FA 32 6E 23 14 74   .7wwC.S1 @..2n#.t
06A0: F0 F6 AA 00 00 00 00 00   F4 44 83 B8 39 F0 12 F3   ........ .D..9...
06B0: B8 40 F0 F2 BC D2 BB 43   40 C4 BE 27 53 BF A8 C8   .@.....C @..'S...
06C0: F0 AA 53 60 B8 44 C6 D4   B9 4C D2 CE B? 48 F1 96   ..S`.D.. .L...H..
06D0: D4 F8 D3 80 A0 B8 57 B9   39 53 7F 07 D0 96 E7 FA   ......W. 9S......
06E0: 92 E7 F1 43 20 C4 EA F1   53 DF A1 37 B2 F1 FF F4   ...C ... S..7....
06F0: E5 74 00 E4 A3 23 69 29   A1 C9 FA A1 E4 AE FF FF   .t...#i) ........
0700: B8 69 A0 C8 F9 A0 85 54   CE F6 21 B8 56 B9 6A F8   .i.....T ..!.V.j.
0710: A1 19 23 02 A1 B8 68 19   F4 DC 74 BB E6 21 95 B6   ..#...h. ..t..!..
0720: 07 83 F4 BC F4 CA F4 C3   B8 37 F0 47 5F C6 3F B9   ........ .7.G_.?.
0730: 55 D1 5F 96 3F 18 F0 F2   3C 53 60 83 27 A8 83 C7   U._.?... <S`.'...
0740: 07 D7 E4 AC BA 12 E4 4A   BA 08 B8 61 B9 66 F8 96   .......J ...a.f..
0750: 5D F1 C6 58 11 B8 D1 83   B8 3E F8 4A A8 83 B8 56   ]..X.... .>.J...V
0760: B9 39 F1 B9 57 37 53 01   C6 72 F1 83 C2 D0 C6 72   .9..W7S. .r.....r
0770: F8 07 A0 83 B8 56 B9 44   F1 53 7F D0 83 B8 3F 20   .....V.D .S....?
0780: 43 80 28 93 F5 34 D2 E5   83 F5 74 00 E5 83 F5 54   C.(..4.. ..t....T
0790: 51 E5 83 F5 34 00 E5 83   FF FF FF FF FF FF FF 00   Q...4... ........
07A0: 00 24 00 89 80 00 00 00   00 00 44 00 89 80 89 80   .$...... ..D.....
07B0: 00 00 00 00 83 89 80 00   00 00 00 83 89 80 00 00   ........ ........
07C0: 00 00 83 89 80 00 00 00   00 83 89 80 00 00 00 00   ........ ........
07D0: 00 00 83 89 80 00 00 00   00 00 00 83 89 80 00 00   ........ ........
07E0: 00 00 00 00 83 89 80 00   00 00 00 00 00 83 89 80   ........ ........
07F0: 00 00 00 00 00 00 83 00   00 F5 14 00 E5 89 80 FF   ........ ........
0800: B8 37 F0 47 B9 39 40 F2   79 B8 3B F0 37 12 94 B9   .7.G.9@. y.;.7...
0810: 53 F1 5F C6 8E BA 86 74   1E F6 8E AC BA 07 F1 47   S._....t .......G
0820: 5A C6 8E A9 B8 4D F0 47   5A C6 8E 37 2A 50 C6 8E   Z....M.G Z..7*P..
0830: AB 6A 67 2B 37 17 69 2B   F2 42 F6 44 B8 51 BA 10   .jg+7.i+ .B.D.Q..
0840: 04 4C F6 48 F9 6A F6 3C   B8 4F BA 01 F0 5F AD C6   .L.H.j.< .O..._..
0850: 85 F0 47 5F AE C6 85 B9   4E FD 74 1E F6 85 AD FA   ..G_.... N.t.....
0860: 2E 2A E7 2A 74 1E 2E AA   F6 85 FD 37 6E F6 80 FC   .*.*t... ...7n...
0870: 37 6D E6 79 FC 37 6E E6   85 B8 39 F8 53 F7 A8 83   7m.y.7n. ..9.S...
0880: FC 37 6D E6 74 13 FA E7   E7 AA 53 11 C6 4C B8 39   .7m.t... ..S..L.9
0890: F8 43 08 A8 83 89 00 BA   FA E5 04 F5 F5 E6 A5 B9   .C...... ........
08A0: 3F F1 43 04 A1 B9 3B F1   AB B9 02 BA BC 52 B3 B9   ?.C...;. .....R..
08B0: 03 BA 34 E5 D4 F5 F5 F6   BF B9 3F F1 43 08 A1 B9   ........ ..?.C...
```

```
08C0: 3B F1 37 F2 FD BC 01 FB  BB 31 52 CE BB 41 54 00   ;.7..... .1R..AT.
08D0: FC E7 AC 37 92 CE BC 01  B9 3D F1 52 F3 F8 03 BF   ...7.... .=.R....
08E0: F6 FD FB 03 04 AB BC 04  B9 28 F1 53 E0 96 F3 19   ........ .(.S....
08F0: F1 C6 F5 B8 28 54 00 FC  E7 AC 37 92 F5 83 FF FF   ....(T.. ..7.....
0900: AC C6 27 B8 68 B2 08 C8  B9 3B F1 F7 F7 B9 39 F1   ..'.h... .;....9.
0910: 37 52 1B 27 F6 1A B8 5F  A0 18 A0 F6 24 B8 5F F0   7R.'..._ ....$._.
0920: 13 40 24 25 F8 96 6D B8  3F F0 53 9F 4C 20 D0 5C   .@$%..m. ?.S.L .\
0930: B8 66 C6 4F B9 61 B1 F3  FC F7 F7 23 50 F6 45 E5   .f.O.a.. ...#P.E.
0940: 74 F0 F5 24 49 E5 74 F4  F5 B0 00 F6 4F B0 F7 B9   t..$I.t. ....O...
0950: 39 F1 53 FB 21 37 52 5A  B0 00 B8 3E B9 32 F1 F2   9.S.!7RZ ...>.2..
0960: 6C FC C6 6C 53 20 AC F8  53 DF 4C A0 27 83 B3 3E   l..lS .. S.L.'..>
0970: B9 39 F1 72 7A B9 37 F1  52 B9 F0 F2 B9 B9 34 F1   .9.rz.7. R.....4.
0980: 37 F2 AB B9 3B F1 52 AB  B9 3F F1 37 D2 AB B9 40   7...;.R. .?.7...@
0990: F1 D3 1C 53 1C C6 9B F0  37 92 B4 B9 5F F1 C6 B4   ...S.... 7..._...
09A0: F0 5F 96 B4 B9 44 F1 C6  B4 24 B9 F0 5F 96 B9 B9   ._...D.. .$.._...
09B0: 44 F1 96 BD F0 53 EF 24  BC F8 43 10 A0 B9 32 F1   D....S.$ ..C...2.
09C0: 37 F2 D1 B9 39 F1 72 CD  F8 43 20 24 D0 F0 53 DF   7...9.r. .C $..S.
09D0: A0 83 AF B9 08 DE 67 FD  67 2E 67 2E AD 37 F2 E7   ......g. g.g..7..
09E0: D3 DF AD FE D3 01 AE FF  77 AF E9 D5 BF 0F 97 33   ........ w......3
09F0: FF FF FF FF FF FF FF FF  FF FF FF FF FF FF FF FF   ........ ........
0A00: B9 69 FB A3 A1 C9 1B FB  A3 A1 1B E5 F4 AE F5 B9   .i...... ........
0A10: 40 FC 53 03 C6 1B 27 E6  2E 44 1D F6 2E F1 5C AD   @.S...'. .D....\.
0A20: C6 2A 53 03 BD 20 96 2A  BD 10 FD 4C 43 00 41 A1   .*S.. .* ...LC.A.
0A30: 83 00 96 00 C8 05 14 04  4C 00 96 00 C8 03 20 02   ........ L.......
0A40: EE 00 96 00 C8 05 14 04  4C 00 96 00 C8 05 14 04   ........ L.......
0A50: 4C B9 68 23 02 E5 F4 DC  F5 C9 F1 53 7F 21 B8 49   L.h#.... ...S.!.I
0A60: F2 64 B8 45 F1 C9 96 7B  F1 03 F1 F6 7B B9 44 F1   .d.E...{ ....{.D.
0A70: 53 7F B9 56 D1 B9 68 C6  7C 44 8E 10 18 E5 F4 AE   S..V..h. |D......
0A80: F5 E6 8E F1 A0 18 19 F1  A0 18 B9 56 F1 A0 83 B8   ........ ...V....
0A90: 3E F0 53 03 03 7F 53 80  A9 F0 53 0C 03 3C 53 40   >.S...S. ..S..<S@
0AA0: 49 A9 F8 53 10 E7 49 A9  F8 53 0A C6 B1 F9 43 10   I..S..I. .S....C.
0AB0: A9 B8 5B F0 5F D3 07 C6  C9 B8 40 F0 53 30 E7 E7   ..[._... ..@.S0..
0AC0: AA 37 59 2A 4F 18 50 4A  A0 83 43 4F 50 59 52 49   .7Y*O.PJ ..COPYRI
0AD0: 47 48 54 20 28 43 29 20  31 39 38 35 2C 38 36 20   GHT (C)  1985,86
0AE0: 42 59 20 50 41 52 4B 45  52 20 45 4C 45 43 54 52   BY PARKE R ELECTR
0AF0: 4F 4E 49 43 53 20 49 4E  43 FF FF FF FF FF FF FF   ONICS IN C.......
0B00: E7 BB 09 BC 19 EC 05 64  0B 12 0F 99 DF 64 13 89   .......d .....d..
0B10: 20 64 13 77 00 BC 09 EC  17 EB 09 89 20 83 AB 03    d.w.... .... ...
0B20: F4 E6 26 96 30 AB FA 51  C6 2E FB 03 0C AB F3 97   ..&.0..Q ........
0B30: 83 FF FF FF FF FF FF FF  FF FF FF FF FF FF FF FF   ........ ........
0B40: FF FF FF FF FF FF FF FF  FF FF FF FF FF FF FF FF   ........ ........
0B50: FF FF FF FF FF FF FF FF  FF FF FF FF FF FF FF FF   ........ ........
0B60: FF FF FF FF FF FF FF FF  FF FF FF FF FF FF FF FF   ........ ........
0B70: FF FF FF FF FF FF FF FF  FF FF FF FF FF FF FF FF   ........ ........
0B80: FF FF FF FF FF FF FF FF  FF FF FF FF FF FF FF FF   ........ ........
0B90: FF FF FF FF FF FF FF FF  FF FF FF FF FF FF FF FF   ........ ........
0BA0: FF FF FF FF FF FF FF FF  FF FF FF FF FF FF FF FF   ........ ........
0BB0: FF FF FF FF FF FF FF FF  FF FF FF FF FF FF FF FF   ........ ........
0BC0: FF FF FF FF FF FF FF FF  FF FF FF FF FF FF FF FF   ........ ........
0BD0: FF FF FF FF FF FF FF FF  FF FF FF FF FF FF FF FF   ........ ........
0BE0: FF FF FF FF FF FF FF FF  FF FF FF FF FF FF FF FF   ........ ........
0BF0: FF FF FF FF FF FF FF FF  FF FF FF FF FF FF FF FF   ........ ........
0C00: FF FF FF FF FF FF FF FF  FF FF FF FF FF FF FF FF   ........ ........
0C10: FF FF FF FF FF FF FF FF  FF FF FF FF FF FF FF FF   ........ ........
0C20: FF FF FF FF FF FF FF FF  FF FF FF FF FF FF FF FF   ........ ........
0C30: FF FF FF FF FF FF FF FF  FF FF FF FF FF FF FF FF   ........ ........
```

```
0C40: FF FF FF FF FF FF FF FF   FF FF FF FF FF FF FF FF   ........ ........
0C50: FF FF FF FF FF FF FF FF   FF FF FF FF FF FF FF FF   ........ ........
0C60: FF FF FF FF FF FF FF FF   FF FF FF FF FF FF FF FF   ........ ........
0C70: FF FF FF FF FF FF FF FF   FF FF FF FF FF FF FF FF   ........ ........
0C80: FF FF FF FF FF FF FF FF   FF FF FF FF FF FF FF FF   ........ ........
0C90: FF FF FF FF FF FF FF FF   FF FF FF FF FF FF FF FF   ........ ........
0CA0: FF FF FF FF FF FF FF FF   FF FF FF FF FF FF FF FF   ........ ........
0CB0: FF FF FF FF FF FF FF FF   FF FF FF FF FF FF FF FF   ........ ........
0CC0: FF FF FF FF FF FF FF FF   FF FF FF FF FF FF FF FF   ........ ........
0CD0: FF FF FF FF FF FF FF FF   FF FF FF FF FF FF FF FF   ........ ........
0CE0: FF FF FF FF FF FF FF FF   FF FF FF FF FF FF FF FF   ........ ........
0CF0: FF FF FF FF FF FF FF FF   FF FF FF FF FF FF FF FF   ........ ........
0D00: FF FF FF FF FF FF FF FF   FF FF FF FF FF FF FF FF   ........ ........
0D10: FF FF FF FF FF FF FF FF   FF FF FF FF FF FF FF FF   ........ ........
0D20: FF FF FF FF FF FF FF FF   FF FF FF FF FF FF FF FF   ........ ........
0D30: FF FF FF FF FF FF FF FF   FF FF FF FF FF FF FF FF   ........ ........
0D40: FF FF FF FF FF FF FF FF   FF FF FF FF FF FF FF FF   ........ ........
0D50: FF FF FF FF FF FF FF FF   FF FF FF FF FF FF FF FF   ........ ........
0D60: FF FF FF FF FF FF FF FF   FF FF FF FF FF FF FF FF   ........ ........
0D70: FF FF FF FF FF FF FF FF   FF FF FF FF FF FF FF FF   ........ ........
0D80: FF FF FF FF FF FF FF FF   FF FF FF FF FF FF FF FF   ........ ........
0D90: FF FF FF FF FF FF FF FF   FF FF FF FF FF FF FF FF   ........ ........
0DA0: FF FF FF FF FF FF FF FF   FF FF FF FF FF FF FF FF   ........ ........
0DB0: FF FF FF FF FF FF FF FF   FF FF FF FF FF FF FF FF   ........ ........
0DC0: FF FF FF FF FF FF FF FF   FF FF FF FF FF FF FF FF   ........ ........
0DD0: FF FF FF FF FF FF FF FF   FF FF FF FF FF FF FF FF   ........ ........
0DE0: FF FF FF FF FF FF FF FF   FF FF FF FF FF FF FF FF   ........ ........
0DF0: FF FF FF FF FF FF FF FF   FF FF FF FF FF FF FF FF   ........ ........
0E00: FF FF FF FF FF FF FF FF   FF FF FF FF FF FF FF FF   ........ ........
0E10: FF FF FF FF FF FF FF FF   FF FF FF FF FF FF FF FF   ........ ........
0E20: FF FF FF FF FF FF FF FF   FF FF FF FF FF FF FF FF   ........ ........
0E30: FF FF FF FF FF FF FF FF   FF FF FF FF FF FF FF FF   ........ ........
0E40: FF FF FF FF FF FF FF FF   FF FF FF FF FF FF FF FF   ........ ........
0E50: FF FF FF FF FF FF FF FF   FF FF FF FF FF FF FF FF   ........ ........
0E60: FF FF FF FF FF FF FF FF   FF FF FF FF FF FF FF FF   ........ ........
0E70: FF FF FF FF FF FF FF FF   FF FF FF FF FF FF FF FF   ........ ........
0E80: FF FF FF FF FF FF FF FF   FF FF FF FF FF FF FF FF   ........ ........
0E90: FF FF FF FF FF FF FF FF   FF FF FF FF FF FF FF FF   ........ ........
0EA0: FF FF FF FF FF FF FF FF   FF FF FF FF FF FF FF FF   ........ ........
0EB0: FF FF FF FF FF FF FF FF   FF FF FF FF FF FF FF FF   ........ ........
0EC0: FF FF FF FF FF FF FF FF   FF FF FF FF FF FF FF FF   ........ ........
0ED0: FF FF FF FF FF FF FF FF   FF FF FF FF FF FF FF FF   ........ ........
0EE0: FF FF FF FF FF FF FF FF   FF FF FF FF FF FF FF FF   ........ ........
0EF0: FF FF FF FF FF FF FF FF   FF FF FF FF FF FF FF FF   ........ ........
0F00: FF FF FF FF FF FF FF FF   FF FF FF FF FF FF FF FF   ........ ........
0F10: FF FF FF FF FF FF FF FF   FF FF FF FF FF FF FF FF   ........ ........
0F20: FF FF FF FF FF FF FF FF   FF FF FF FF FF FF FF FF   ........ ........
0F30: FF FF FF FF FF FF FF FF   FF FF FF FF FF FF FF FF   ........ ........
0F40: FF FF FF FF FF FF FF FF   FF FF FF FF FF FF FF FF   ........ ........
0F50: FF FF FF FF FF FF FF FF   FF FF FF FF FF FF FF FF   ........ ........
0F60: FF FF FF FF FF FF FF FF   FF FF FF FF FF FF FF FF   ........ ........
0F70: FF FF FF FF FF FF FF FF   FF FF FF FF FF FF FF FF   ........ ........
0F80: FF FF FF FF FF FF FF FF   FF FF FF FF FF FF FF FF   ........ ........
0F90: FF FF FF FF FF FF FF FF   FF FF FF FF FF FF FF FF   ........ ........
0FA0: FF FF FF FF FF FF FF FF   FF FF FF FF FF FF FF FF   ........ ........
0FB0: FF FF FF FF FF FF FF FF   FF FF FF FF FF FF FF FF   ........ ........
```

```
0FC0: FF FF FF FF FF FF FF FF  FF FF FF FF FF FF FF FF   ........ ........
0FD0: FF FF FF FF FF FF FF FF  FF FF FF FF FF FF FF FF   ........ ........
0FE0: FF FF FF FF FF FF FF FF  FF FF FF FF FF FF FF FF   ........ ........
0FF0: FF FF FF FF FF FF FF FF  FF FF FF FF FF FF FF FF   ........ ........
1000: 75 04 09 15 D5 A4 F9 04  0C F5 34 8B D5 AF 23 F7   u....... ......#.
1010: 62 B8 58 F0 17 C6 2B B9  F7 81 37 72 2B 19 81 A9   b.X...+. ..7r+...
1020: 18 F0 03 6A F2 2B F6 2B  10 29 A1 B8 5B 10 F0 53   ...j.+.+ .)..[..S
1030: 0F D3 0E 96 36 30 D3 0E  12 3E 77 03 D3 B3 F4 69   ....60.. .>w....i
1040: FC C6 C5 53 F0 96 C5 B8  3C F0 03 F5 E6 C5 04 4E   ...S.... <......N
1050: 64 00 B9 02 18 F0 C6 59  10 E9 54 B8 3E F0 53 BF   d......Y ..T.>.S.
1060: A0 43 80 04 C2 64 5F 54  00 04 C1 B8 5E 10 F0 53   .C...d_T ....^..S
1070: 3F 96 7F B9 40 F1 53 00  C6 7F E7 E7 19 D1 A1 F0   ?...@.S. ........
1080: 96 C5 B9 07 04 54 B8 5A  B9 35 F0 96 9C F1 37 47   .....T.Z .5....7G
1090: 61 17 C6 BC 18 F0 F7 77  A8 C8 23 D8 07 A0 18 96   a......w ..#.....
10A0: A9 11 F0 F2 A9 F1 07 07  A1 F0 F7 FE F6 AF 37 53   ........ ......7S
10B0: 03 AA 77 2A E7 4A 03 02  53 03 43 04 2E 53 78 4E   ..w*.J.. S.C..SxN
10C0: AE FE B8 F9 90 C7 07 53  07 E7 03 09 A8 F0 53 EF   .......S ......S.
10D0: A0 FF 93 50 52 65 67 6B  86 C5 F1 AA 19 F1 2A 04   ...PRegk ......*.
10E0: E3 BA 00 AF 27 AC AD B9  0B FF F7 AF FA F7 AA 47   ....'... .......G
10F0: F7 FC 7C 57 AC FD 7D 57  AD E9 E9 AA FC BF 0F 83   ..|W..}W ........
1100: 54 F6 B9 55 96 0A B1 07  84 FA F1 96 08 B9 39 F1   T..U.... ......9.
1110: 32 08 F0 B9 39 BA F0 F2  BD D2 86 B2 5D 19 F1 37   2...9... ....]..7
1120: 52 53 B8 64 F0 96 5C F1  53 FB A1 B8 30 39 2E F0   RS.d..\. S...09..
1130: 5A C6 40 AB F1 5F 4B A1  47 37 68 F6 40 FB 47 31   Z.@.._K. G7h.@.G1
1140: F0 5F C6 50 AB 31 FB 47  37 61 F6 50 FB 47 48 A1   ._.P.1.G 7a.P.GH.
1150: 27 F4 80 B8 39 F0 72 5C  B8 30 90 00 83 F1 B9 30   '...9.r\ .0.....0
1160: 72 64 B9 2E F0 12 70 F1  5F C6 08 F1 07 A1 24 B1   rd....p. _.....$.
1170: F1 5F 17 92 08 11 07 C6  B1 F1 07 47 D1 5A 96 B1   ._...... ...G.Z..
1180: F1 03 10 A1 24 B1 F1 B9  30 72 8D B9 2E F0 72 9A   ....$... 0r....r.
1190: F1 5A C6 08 F1 03 10 A1  24 B1 F1 47 5F 07 C6 08   .Z...... $..G_...
11A0: 21 03 F0 21 17 C6 B1 F1  47 17 D1 5F 96 B1 F1 07   !..!.... G.._....
11B0: A1 B8 3A F0 43 04 A0 B8  64 B9 FE 24 08 F5 84 00   ..:.C... d..$....
11C0: B8 3D F0 47 5F 14 E1 AA  B8 3B F0 B8 32 92 D0 C8   .=.G_... .;..2...
11D0: F8 D4 92 C6 C8 F0 B8 3D  B2 F7 52 E5 F8 53 F0 C6   .......= ..R..S..
11E0: F3 03 F0 24 ED F0 03 60  F6 F3 F0 03 10 30 A0 23   ...$...` .....0.#
11F0: 03 F4 80 94 FA 24 C0 23  10 D4 F3 24 C0 FF FF FF   .....$.# ...$....
1200: B8 F6 76 16 B5 FD F7 B9  33 F6 0D B9 31 F1 C8 90   ..v..... 3...1...
1210: 18 19 F1 F7 77 90 80 F2  7C A5 FD F2 2A 43 80 AD   ....w... |...*C..
1220: 8A 10 FE 53 07 AE B9 22  44 53 FE B2 4B 92 44 72   ...S..." DS..K.Dr
1230: 3D 43 08 AE 80 53 40 2D  53 BF 4D AD 83 03 08 AE   =C...S@- S.M.....
1240: B9 24 44 53 43 38 AE B9  26 44 53 9A EF FD 53 7F   .$DSC8.. &DS...S.
1250: AD B9 28 27 AA BB 03 97  F7 2A F7 2A 61 19 2A 71   ..('.... .*.*a.*q
1260: 2A C9 EB 57 AB C8 80 6B  AB 18 80 53 07 7A BA 03   *..W...k ...S.z..
1270: 97 67 2B 67 2B EA 70 2B  A1 19 FB A1 83 B9 55 F1   .g+g+.p+ ......U.
1280: C6 E8 94 FA B8 63 F0 96  9E B9 55 F1 07 A1 C6 E8   .....c.. ..U.....
1290: B8 3B F0 72 9A F1 D3 04  C6 8D B8 63 B0 FF F1 03   .;.r.... ...c....
12A0: EE B3 B8 54 F0 14 E1 AB  C8 F0 5F C6 89 14 E1 AA   ...T.... .._.....
12B0: 03 F0 A7 F0 BE 08 F2 BA  BE 10 FE 67 E4 45 88 35   ........ ...g.E.5
12C0: F0 5F 14 E1 AB F0 47 5F  14 E1 44 EB B8 63 80 08   ._....G_ ..D..c..
12D0: 83 44 CC 00 B8 24 44 DA  B8 22 94 00 23 20 E4 45   .D...$D. ."..# .E
12E0: B8 2A 94 00 AE B8 2C 94  00 AB FE AA 27 E4 45 CC   .*....,. ....'.E.
12F0: D1 BE D4 A2 D8 D8 B8 38  F0 77 77 D0 37 53 03 83   .......8 .ww.7S..
1300: B8 3A F0 53 F8 AB B8 41  F0 AA 18 B9 F0 FB 72 4D   .:.S...A ......rM
1310: 37 32 33 C8 F8 E7 47 53  40 2A F7 2A F7 77 A9 F8   723...GS @*.*.w..
1320: 53 0D 49 A9 B8 39 F0 77  77 53 82 49 B9 F2 91 19   S.I..9.w wS.I....
1330: B8 43 C8 F0 47 A0 53 0F  03 4F A3 2A F7 2A F7 77   .C..G.S. .O.*.*.w
```

```
1340: 23 97 A7 F7 2B E6 49 53   80 91 19 64 80 34 C5 1F   #...+.IS   ...d.4..
1350: 06 5B 4F 66 60 7D 07 7F   67 39 79 71 3D 76 73 89   .[Of`}..   g9yq=vs.
1360: 1F BA 1F FD 53 E0 A9 09   37 5A 49 2D DD 5A 96 BA   ....S...   7ZI-.Z..
1370: B8 FC 80 37 47 2C DC 96   BA FD 53 0F A9 FC 53 F0   ...7G,..   ..S...S.
1380: 49 B8 37 A0 FC 53 0F A9   FD 53 10 49 A9 16 F8 5A   I.7..S..   .S.I...Z
1390: A0 BA 30 BB 80 F9 5A 96   A7 F8 5A C6 A7 FA 37 53   ..0...Z.   ..Z...7S
13A0: 0F 59 96 A7 F8 4B A0 FB   77 AB FA 77 77 AA 37 F2   .Y...K..   w..ww.7.
13B0: 95 F9 40 A0 03 A0 27 67   40 A0 04 C5 B8 57 F0 17   ..@...'g   @....W..
13C0: 14 E1 AA B9 30 64 CD B8   3B F0 D2 CD C9 F9 D4 92   ....0d..   ;.......
13D0: C6 BC D2 DC 23 00 C6 DC   D4 F3 64 BC F8 B8 57 53   ....#...   ..d...WS
13E0: 05 96 E9 F8 C6 F4 07 64   ED F0 17 D2 F4 53 3F A0   .......d   .....S?.
13F0: 23 06 F4 80 94 FA 64 BC   B8 F1 C6 FD 18 F8 C4 92   #.....d.   ........
1400: BB 4D 84 08 B8 26 BB 51   B9 3B F1 47 53 02 AA 6B   .M...&.Q   .;.GS..k
1410: AB A3 60 2B 17 18 A3 70   2A 96 1E FB 84 42 27 A6   ..`+...p   *....B'.
1420: B9 8E BC 09 97 28 67 28   67 29 97 67 29 E6 33 6B   .....(g(   g).g).3k
1430: 28 7A 28 EC 25 03 01 AA   F3 13 08 F2 40 2A 84 42   (z(.%...   ....@*.B
1440: 27 AA 14 E3 AB 47 5F 2A   5F 47 4A AA 83 2C 01 EC   '....G_*   _GJ.....
1450: FF 00 00 C0 FE B8 55 F0   D3 05 B8 22 C6 60 B8 24   ......U.   ...".`.$
1460: 00 54 DA D4 94 C6 55 F0   53 05 97 96 6E A7 88 55   .T....U.   S...n..U
1470: F0 D3 05 B8 31 B9 22 C6   7D B8 33 B9 24 F7 AA BB   ....1.".   }.3.$...
1480: 02 65 FA BC FF BD FF 12   8C BC 01 1D F8 6C A0 19   .e......   .....l..
1490: F0 7D A0 F9 A8 EB 82 55   FA 53 0E B8 08 C6 A1 B8   .}.....U   .S......
14A0: 09 F8 F4 80 94 FA 84 55   B8 39 F0 32 84 B8 37 F0   .......U   .9.2..7.
14B0: 47 5F 96 B5 83 B8 64 B0   8C B8 55 A0 03 C8 B3 94   G_....d.   ..U.....
14C0: FA B8 55 A0 B8 64 A0 84   A8 08 DA DC DE E0 E8 E2   ..U..d..   ........
14D0: E4 E8 EC F0 F2 F4 F6 F8   64 BC A4 4F E4 1C C4 00   ........   d..O....
14E0: 84 55 A4 94 23 02 E4 31   23 01 E4 31 23 00 E4 31   .U..#..1   #..1#..1
14F0: E4 78 E4 78 E4 78 24 C0   E4 57 B9 38 27 A8 83 FF   .x.x.x$.   .W.8'...
1500: B8 3C A0 03 F5 F6 18 F8   07 AC F5 34 A8 AD FD A3   .<......   ...4....
1510: A0 13 1D EE 0E FC D4 B6   E5 B8 3C F0 C6 36 03 EF   ........   ..<..6..
1520: F6 20 F0 14 E1 A8 03 EF   BA EC F6 2E BA 5C 27 F4   . ......   .....\'.
1530: 45 F0 03 F1 F6 37 83 D4   7C F5 34 00 E5 A4 18 99   E....7..   |.4.....
1540: 4A F0 00 51 22 66 00 66   00 3E C5 00 04 00 04 B8   J..Q"f.f   .>......
1550: 4D F0 53 07 47 AA F8 47   53 07 AB 23 60 04 92 C6   M.S.G..G   S..#`...
1560: 4F F8 B8 4D B2 78 72 6E   F8 17 72 90 A4 73 F8 87   O..M.xrn   ..r..s..
1570: 5F C6 90 53 07 30 A4 8C   32 81 F0 03 10 F2 90 A4   _..S.0..   2.......
1580: 88 F0 03 F0 53 F0 C6 90   53 70 30 A0 23 04 F4 80   ....S...   Sp0.#...
1590: 94 FA A4 4F B8 36 54 C0   D4 94 C6 94 F0 B8 36 D2   ...O.6T.   ......6.
15A0: B1 12 AB F0 5F C6 CB F0   07 A4 C2 F0 17 72 C8 A4   ...._...   .....r..
15B0: C2 52 BD F0 53 70 C6 CB   F0 03 F8 A4 C2 F0 83 10   .R.Sp...   ........
15C0: F6 CB 43 80 53 F7 A0 23   02 F4 80 94 FA A4 94 17   ..C.S..#   ........
15D0: AC B9 3B F1 BD 12 B2 DC   BD 0A 1B 1B FB A3 2B 17   ..;.....   ......+.
15E0: A3 6D 2B 13 00 2B EC E1   A0 18 FB A0 83 01 22 01   .m+..+..   ......".
15F0: 54 02 42 01 F4 00 14 00   BE B8 3F 20 43 80 20 93   T.B.....   ..? C. .
1600: 27 D4 B5 54 E8 D4 94 C6   00 F8 B8 2F B2 21 72 17   '..T....   .../.!r.
1610: F0 03 10 F6 36 C4 31 F0   53 F0 C6 36 F0 03 F8 C4   ....6.1.   S..6....
1620: 31 32 2B F8 17 5F C6 36   10 C4 32 F8 5F C6 36 F8   12+.._.6   ..2._.6.
1630: 07 A0 23 01 F4 80 94 FA   C4 00 B8 3D F0 BA B2 72   ..#.....   ...=...r
1640: 42 CA 53 03 17 2A D4 92   C6 3A F0 B8 3D B2 68 47   B.S..*..   .:..=.hG
1650: F7 F0 53 03 F6 58 17 17   07 52 64 20 53 FC 40 A0   ..S..X..   .Rd S.@.
1660: 23 03 F4 80 94 FA C4 3A   F0 D3 08 C4 5F B9 64 F1   #......:   ...._.d.
1670: 96 91 B9 20 A1 19 A1 B9   65 F1 96 81 B9 41 F1 5F   ... ....   e....A._
1680: A1 B9 3E F1 53 C0 21 5F   C6 91 B9 5F B1 8C 19 B1   ..>.S.!_   ..._....
1690: 8C 83 F4 45 F5 34 00 E5   D4 60 B8 37 F8 47 5F C6   ...E.4..   .`.7.G_.
16A0: B0 B9 55 D1 5F 96 B0 18   F8 F2 AE 53 60 83 84 FA   ..U._...   ...S`...
16B0: C7 07 D7 84 BF AA 47 5F   BB ED 96 C3 B8 2F F8 47   ......G_   ...../.G
```

```
16C0: 5F BB F1 B8 2A B4 CF FA   5F BB ED 96 D3 B8 2F F0    _...*..._...../.
16D0: 5F BB F5 B8 2C A4 CF B9   3B F0 BA EF 52 E0 BA DB    _...,...;...R...
16E0: F7 27 13 31 D4 92 C6 D7   B8 04 D2 EE B8 80 F8 D4    .'.1............
16F0: F3 C4 D7 B8 3B D0 A0 94   FA 23 07 E4 80 FF FF FF    ....;....#......
1700: F8 37 61 37 AA 18 19 F8   37 71 37 2A C8 C9 F6 11    .7a7....7q7*....
1710: 83 37 03 01 2A 37 13 00   2A 97 A7 83 B8 3B F0 BA    .7..*7..*....;..
1720: 0A B2 25 BA 0C 23 B8 D4   92 C6 1C 23 20 D4 F3 E4    ..%..#.....# ...
1730: 1C B8 68 A0 B8 68 B9 3B   F0 51 74 F8 C6 34 B8 68    ..h..h.;.Qt..4.h
1740: F8 D4 F3 E4 34 B9 41 31   53 F0 2A 19 A1 19 FB A1    ....4.A1 S.*....
1750: B9 3A F1 5F 4A A1 83 B8   39 F8 53 04 74 F8 C6 57    .:._J... 9.S.t..W
1760: 18 F8 D3 04 A0 94 FA E4   57 B8 5E F8 DD B2 77 B8    ........ W.^...w.
1770: FA 23 03 90 18 27 90 83   23 F0 D4 92 94 FA E4 78    .#...'.. #......x
1780: F5 D4 AD E5 83 FF FF FF   FF FF FF FF FF FF FF FF    ................
1790: FF FF FF FF FF FF FF FF   FF FF FF FF FF FF FF 99    ................
17A0: 7F 00 00 00 00 F5 A4 B7   99 7F 00 00 00 00 84 BF    ................
17B0: F4 00 99 7F 00 00 00 14   E1 99 7F 00 00 00 F4 45    ...............E
17C0: 99 7F 00 00 00 D4 6D 99   7F 00 00 00 F5 34 00 E5    ......m......4..
17D0: 99 7F 00 00 00 F5 54 8F   E5 99 7F 00 00 00 F5 D4    ......T.........
17E0: F6 E5 99 7F 00 00 00 F5   04 D6 E5 99 7F 00 00 00    ................
17F0: F5 D4 81 E5 99 7F 00 99   7F 00 00 00 00 00 00 83    ................
1800: B0 81 18 B0 61 18 B9 3B   23 02 D4 F3 E7 24 45 F0    ....a..; #....$E.
1810: F2 1B B9 57 BB 06 F0 53   3F 04 9A 42 53 03 C6 12    ...W...S ?..BS...
1820: 24 1C B9 53 23 02 D4 F6   B9 3A 41 A1 24 44 F0 67    $..S#....:A.$D.g
1830: D3 30 53 30 C6 34 B9 39   F1 67 E7 04 8E B9 20 23    .0S0.4.9 .g.... #
1840: 0A 04 57 B9 2A 04 49 B9   37 23 0D 04 57 B9 44 23    ..W.*.I. 7#..W.D#
1850: 09 04 57 B9 4D 23 08 D4   F3 24 45 F0 53 9F 20 37    ..W.M#.. .$E.S. 7
1860: 53 60 C6 62 D3 60 B9 3F   21 53 9F 41 A1 B9 38 F1    S`.b.`.? !S.A..;.
1870: 37 32 77 F0 53 FD A0 F1   47 77 B9 37 41 37 B9 39    72w.S... Gw.7A7.9
1880: 72 8A F1 53 08 20 53 F7   40 A0 F1 53 64 40 A1 68    r..S. S. @..Sd@..
1890: 65 B8 8C 24 44 B9 3D BB   03 F0 A1 04 BB B9 40 23    e..$D.=. ......M#
18A0: 06 D4 F6 34 44 23 04 D4   AD 23 05 C4 AD B9 31 3B    ...4D#...#....1.
18B0: 08 04 B7 B9 33 8B 09 23   02 D4 F6 34 44 FB C4 AD    ....3..# ...4D...
18C0: F0 D4 D6 24 44 B9 3E F0   04 8E B9 3B F1 77 77 B9    ...$D.>. ...;.ww.
18D0: 3E 51 52 93 B9 41 F0 31   04 8E F0 53 08 B9 3A 21    >QR..A.1 ...S..:!
18E0: 53 F7 41 21 C6 93 B9 F0   BA 85 18 F0 91 19 EA EA    S.A!............
18F0: 04 8F B9 30 F0 04 2B E5   B4 00 F5 83 FF FF FF FF    ...0..+.........
1900: 54 8F E6 05 83 D3 09 96   25 18 F0 37 96 1C F8 A9    T....... %..7....
1910: 18 BA 04 F0 A1 18 19 37   C6 1E EA 13 44 F5 FA 03    .......7 ....D...
1920: F8 37 B9 6B A1 F0 53 C0   C6 1C F0 D2 31 03 04 24    .7.k..S. ....1..$
1930: 36 03 BC F6 42 F0 03 69   F6 42 B0 06 18 43 C0 03    6...B..i .B...C..
1940: 6A B3 B0 15 27 17 B8 6B   60 A0 B8 67 F0 D3 F1 C6    j...'..k `..g....
1950: 1C C4 81 6A 6C 6E 70 72   74 76 78 7A 7C 7E 84 8A    ...jlnpr tvxz|~..
1960: 90 96 98 9A 9C 9E A8 A2   A4 A6 04 00 04 0F 04 22    ................"
1970: 04 2E 04 3D 04 43 04 47   04 4D 04 53 04 5B B9 2E    ...=.C.G .M.S.[..
1980: BB 00 04 99 B9 2F BB 01   04 99 B9 36 BB 02 04 99    ...../.. ...6....
1990: B9 3B BB 07 04 99 04 95   04 9D 04 AD 04 B3 04 C0    .;......  .......
19A0: 04 C5 04 CA 04 DA 04 F2   E7 E7 03 BA AE A3 A8 1E    ................
19B0: FE A3 AD 1E FE A3 2E 17   A3 83 2E 00 01 3F 2F 01    ............?/.
19C0: 01 40 36 02 01 41 3D 03   01 42 4D 04 01 43 4E 05    .@6..A=. .BM..CN.
19D0: 05 44 57 0A 01 49 3B 0B   01 4A 31 0C 02 4B 33 0E    .DW..I;. .J1..K3.
19E0: 02 4D AF B9 08 DE 67 FD   67 2E 67 2E AD 37 F2 F7    .M....g. g.g..7..
19F0: D3 DF AD FE D3 01 AE FF   77 AF E9 E5 5F 0F 97 83    ........ w..._...
1A00: B8 22 B9 2A E5 F4 00 E6   15 B9 2C F4 00 2A 43 80    ."*....  ..,..*C.
1A10: 2A F6 15 27 AA B9 20 A1   FA 19 A1 B9 39 F1 53 21    *..'.. . ....9.S!
1A20: 96 8D B9 3F F1 00 00 47   77 53 03 AB 96 40 B9 24    ...?...G wS...@.$
1A30: F4 00 BB 01 E6 37 1B B9   3F 03 F6 F6 40 FA C6 45    .....7.. ?...@..E
```

```
1A40: F1 53 FC 4B A1 F1 77 77    B8 21 D0 8A 00 F2 5E 8A    .S.K..ww .!....^.
1A50: 0F F8 53 7F 96 5E C8 F8    53 F8 96 5E F8 AA B8 35    ..S..^.. S..^...5
1A60: FA C6 73 DF C6 73 F0 5F    37 6A 37 E6 6F 37 17 83    ..s..s._ 7j7.o7..
1A70: FD E6 8D FA 96 39 B9 25    F1 87 96 89 C9 F1 03 A2    .....9.% ........
1A80: E6 39 03 6A F6 89 18 F8    AA FA F5 D4 D6 F5 83 27    .9.j.... .......'
1A90: AA AD AE B8 58 A0 B8 69    B4 8A F6 EA C6 ED AB B9    ....X..i ........
1AA0: 5C B1 F8 B9 5C F1 C6 EB    F5 B4 0A F6 A3 18 A0 CA    \...\... ........
1AB0: FA C6 CA D3 FC 96 9F F8    07 C8 40 D3 04 96 ED C8    ........ ..@.....
1AC0: F0 03 02 AA 03 ED E6 9F    44 ED FB D3 F1 C6 D7 B8    ........ D.......
1AD0: 57 F8 17 DB 96 ED 00 FD    4E 96 ED B8 58 B0 FF 18    W....... N...X...
1AE0: A0 B8 6B A0 B9 67 FB A1    18 F8 83 27 A8 B9 F7 23    ..k..g.. ...'...#
1AF0: 80 91 F8 97 A7 B8 59 B0    00 C8 B0 00 83 FF FF FF    ......Y. ........
1B00: B8 39 B9 1D F1 53 40 A9    F8 53 BF 49 A0 B9 65 F1    .9...S@. .S.I..e.
1B10: 96 3B F8 53 6C A0 F2 26    B9 3B F1 12 26 39 37 F1    .;.Sl..& .;..&97.
1B20: 72 26 F8 43 08 A0 18 F8    53 F7 A0 B9 3F F1 53 7F    r&.C.... S...?.S.
1B30: A1 B9 3B F1 92 3B B9 41    F1 5F A1 B4 E7 B8 5B F6    ..;..;.A ._....[.
1B40: 5A F4 4E F1 00 5F AA F8    F2 55 FA F6 51 96 5A 64    Z.N.._.. .U..Q.Zd
1B50: 4F F4 78 64 5A FA C6 5A    F6 4F F8 5F D3 05 C6 8B    O.xdZ..Z .O._....
1B60: B4 E7 B8 22 BA 0D A7 27    13 01 AB A7 F8 AC 18 FA    ..."...' ........
1B70: 37 12 77 FC 40 C6 7F FC    03 24 F8 13 FA E6 82 FA    7.w.@... .$......
1B80: A1 83 FA D1 96 87 A1 18    1A EB 6B 83 34 A8 F5 F4    ........ ..k.4...
1B90: 1D FD 43 80 F4 00 56 96    F4 59 74 D8 2A 5F AC F4    ..C...V. .Yt.*_..
1BA0: 59 9A DF AB 74 E3 2C DA    92 AD C6 C8 83 AA BB 03    Y...t.,. ........
1BB0: FB 03 F7 A3 A9 DA 5F C6    BD EB B8 64 C8 F9 47 5F    ......_. ...d..G_
1BC0: A9 23 80 E7 E9 C3 DC AC    FC A0 18 1D EE 8E 27 83    .#...... ......'.
1BD0: A9 BA 80 BB 08 12 DD FB    03 F7 A3 DA AA F9 77 A9    ........ ......w.
1BE0: EB D5 2A B9 11 5F 97 67    2A 67 2A E6 F1 2B D3 10    ..*.._.g *g*..+..
1BF0: 2B E9 E7 4B D3 10 2A 83    8C 7B 6A 59 47 36 25 13    +..K..*. .{jYG6%.
1C00: B8 3B F8 37 12 88 88 68    27 A0 B8 62 B0 F4 F4 4A    .;.7...h '..b...J
1C10: B8 62 F8 C6 88 34 00 B8    37 F8 AD B9 52 52 21 B9    .b...4.. 7...RR!.
1C20: 50 B8 68 F8 BC 80 32 2B    C9 BC 20 F9 2D 52 32 FC    P.h...2+ .. .-R2.
1C30: 47 AC F9 B8 4E 12 41 FC    77 AC F1 F4 69 43 02 84    G...N.A. w...iC..
1C40: 46 F1 47 F4 69 17 E5 F4    45 54 F6 F5 C6 76 F8 B8    F.G.i... ET...v..
1C50: 68 F2 88 D2 5E 37 82 10    F8 17 53 03 84 09 FD A9    h...^7.. ..S.....
1C60: F8 12 69 F1 F4 37 31 84    70 F1 47 F4 37 47 31 A1    ..i..71. p.G.7G1.
1C70: 23 05 D4 AD 84 0A F8 53    E0 C6 18 C8 F8 B9 51 52    #......S ......QR
1C80: 83 B9 4F 27 A1 19 84 6F    E5 84 FA E5 F4 6F F5 89    ..O'...o .....o..
1C90: 40 B8 7F 60 00 E8 93 99    BF BF 0F 88 1D B0 48 23    @..`.... ......H#
1CA0: F7 62 55 25 B8 68 F8 03    F6 F6 B8 F8 74 8C B8 68    .bU%.h.. ....t..h
1CB0: 10 C6 A4 F0 14 F7 84 A4    B0 FE B4 E7 F6 E8 B8 35    ........ .......5
1CC0: B8 30 F4 48 E6 CC 96 C2    23 0B 84 E4 65 B8 5A B0    .0.H.... #...e.Z.
1CD0: 00 B8 35 B0 09 55 F4 48    F6 E6 96 D6 B8 68 18 F0    ..5..U.H .....h..
1CE0: 96 CC 23 0C 14 F7 F4 78    54 EB B8 5F B0 8C 18 B8    ..#....x T.._....
1CF0: 8C B8 62 B0 FC A4 87 FF    FF FF FF FF FF FF FF FF    ..b..... ........
1D00: B9 67 A1 B9 5C 81 F8 97    A4 8C 97 A7 8A B2 0C BF    .g..\... ........
1D10: 0F B9 5B F1 5F D3 05 C6    28 B9 1D F1 53 DF A1 B9    ..[._... (...S...
1D20: 5E F1 53 28 B9 1D 41 A1    0A B2 7A 05 F6 51 B9 5C    ^.S(..A. ..z..Q.\
1D30: F1 96 37 23 0F 04 F7 B9    F7 81 12 0F A9 E7 E7 49    ..7#.... .......I
1D40: 47 53 88 B9 3F 41 A1 F2    62 B9 67 F1 B9 F8 91 A4    GS..?A.. b.g.....
1D50: 62 B9 59 F1 C9 D1 96 59    83 F1 11 03 6A A9 F1 B9    b.Y....Y ....j...
1D60: 67 A1 B9 5E F1 5F 17 03    0A 37 B9 5D A1 B9 3F F1    g..^._.. .7.]..?.
1D70: 53 7F 21 F2 7C B9 67 F1    24 E2 E4 2B C7 07 D7 44    S.!.|.g. $..+...D
1D80: EC B8 2E F4 A3 C6 8B 23    01 14 F7 B8 30 F4 A3 C6    .......# ....0...
1D90: 93 B0 00 B8 32 B9 09 F4    96 B8 34 B9 0A F4 96 B8    ....2... ..4.....
1DA0: 36 F8 37 47 50 F2 AB 23    03 14 F7 B8 3D F8 03 50    6.7GP..# ....=..P
1DB0: E6 B6 23 04 14 F7 83 E5    84 18 34 00 94 A8 B8 39    ..#..... ..4....9
```

```
1DC0: F0 B8 30 72 C7 B8 2E F0   D4 B5 F5 34 00 E5 B8 3C   ..0r.... ...4...<
1DD0: F0 96 D5 54 7D F4 F7 F5   54 00 34 00 D4 00 B4 81   ...T}... T.4.....
1DE0: 74 00 34 00 F5 A4 B7 B9   3B F1 19 97 00 00 00 00   t.4..... ;.......
1DF0: F1 03 F5 53 FE C6 F8 97   83 FF FF FF FF FF FF FF   ...S.... ........
1E00: B8 39 F0 12 14 92 0C 89   2B F1 92 15 E5 04 81 F5   .9...... +.......
1E10: F0 53 DF A0 83 19 F1 96   1F 23 85 F4 87 F6 2B B9   .S...... .#....+.
1E20: 3E F1 5F C6 0C E5 D4 7C   F5 C4 10 23 0F F4 87 E6   >._....| ...#....
1E30: 14 B9 5F F1 C6 41 03 0D   F6 14 F8 37 52 14 81 F3   .._..A.. ...7R...
1E40: 83 F0 43 20 53 FB A0 2B   3D 89 3F F1 4F 02 51 F0   ..C S..+ =.?.O.Q.
1E50: 47 D4 D6 18 F8 52 5B B9   61 B1 FA 43 04 A0 E7 53   G....R[. a..C...S
1E60: 10 43 40 B9 41 31 A1 23   14 F4 87 E6 14 B9 61 F1   .C@.A1.# ......a.
1E70: 96 14 F8 43 08 A0 23 19   F4 87 E6 14 F0 43 10 A0   ...C..#. .....C..
1E80: 83 27 AD AE B8 6A F0 B4   00 B9 57 F1 17 B4 00 18   .'...j.. ..W.....
1E90: F0 AA B4 00 23 04 B4 00   23 01 B4 00 18 F0 F5 B4   ....#... #.......
1EA0: 00 EA 9C FD A8 FE B4 00   F8 B4 00 44 F5 A8 17 B9   ........ ...D....
1EB0: 3C D1 96 B5 A1 F8 34 A8   F5 F4 1D FD 43 C0 F4 00   <.....4. ....C...
1EC0: F4 1D FD 1D 43 40 F4 00   F0 18 74 D0 F4 05 FA F4   ....C@.. ..t.....
1ED0: 05 9A DF EE B8 83 5F 47   AA 84 E7 F6 F2 B9 36 FA   ......_G ......6.
1EE0: 37 61 F6 E6 F1 AA C9 FA   D1 53 F0 C6 F2 FA 65 31   7a...... .S....e1
1EF0: A1 55 83 29 28 29 AC AD   F0 A1 18 19 EC F8 FD 83   .U.)().. ........
1F00: B9 09 77 E4 0F B9 08 F2   0F 9A 7F 8A 40 E4 15 8A   ..w..... ....@...
1F10: 80 8A 40 E4 15 E7 8A 40   9A BF E9 07 83 9A 7F B9   ..@....@ ........
1F20: 5C B1 FB 8A 20 0A 37 B2   33 A4 0F 46 2E 83 B9 5C   \... .7. 3..F...\
1F30: F1 96 29 23 10 04 F7 5F   17 AB 03 F4 E6 46 C6 41   ..)#..._ .....F.A
1F40: 83 B8 4E F0 DC A0 FB 83   B4 0A B9 38 B1 00 B9 1D   ..N..... ...8....
1F50: F1 F7 F7 B9 35 F1 47 D1   83 23 01 8A 40 97 F7 46   ....5.G. .#..@..F
1F60: 62 17 9A BF 9A BF E6 5B   83 5F 03 00 57 AA F0 5C   b......[ ._..W..\
1F70: C6 75 23 34 83 23 38 83   B8 5A F0 03 F3 E4 86 80   .u#4.#8. .Z......
1F80: 0C 23 01 B8 35 30 83 AA   B9 21 F1 C9 97 F7 E6 95   .#..50.. .!......
1F90: 96 95 FA 37 61 83 F0 53   7F 03 FE 03 FC F6 A0 93   ...7a..S ........
1FA0: F9 04 F7 F0 47 5F C6 AD   37 68 C7 53 40 83 FF FF   ....G_.. 7h.S@...
1FB0: FF FF FF FF FF FF FF FF   FF FF FF FF FF FF FF FF   ........ ........
1FC0: FF FF FF FF FF FF FF FF   FF FF FF FF FF FF FF FF   ........ ........
1FD0: FF FF FF FF FF FF FF FF   FF FF FF FF FF FF FF FF   ........ ........
1FE0: FF FF FF FF FF FF FF FF   FF FF FF FF FF FF FF FF   ........ ........
1FF0: FF FF FF FF FF FF FF FF   FF FF FF FF FF FF FF FF   ........ ........
2000: 0D 0A 1A 2A 2A 46 FE                                ...**F.
```

What is claimed as new and what is desired to be secured by Letters Patent of the United States is:

1. In a system for monitoring and controlling the condition of air in a plurality of zones within predetermined operating limits using a single zone HVAC unit, operated by a first control means, in which conditioned air passes into a plurality of zones via a plurality of dampers, each operated by a control means, in a plurality of ducts communicating with respective zones, a thermostat means for operating said first control means and said control means for one said damper in one said zone, said thermostat means comprising:

first circuit means responsive to input signals for establishing operating limits for said one zone and providing a first digital word output signal representative of said operating limits;

second circuit means responsive to input signals indicative of the actual condition of air in said one zone for providing a second digital word output signal representative of the actual condition of air therein;

third circuit means adapted to be coupled to a peripheral circuit means for receiving data from a peripheral circuit means and for providing a third digital word output signal representative of the information contained in such data;

fourth circuit means responsive to output signals from said first, second, and third circuit means for providing fourth digital word output signals for operating said control means of said one damper and said first control means;

programmable logic means for providing digital word input signals to said fourth circuit means for selectively controlling said fourth circuit means; and logic means for selectively operating said one damper control means and said first control means in response to respective said fourth digital word input signals from said fourth circuit means.

2. In the system as defined in claim 1, wherein said thermostat means includes means for providing information to peripheral circuit means, the information including any digital word signal associated with said first, second, and third circuit means and said programmable logic means.

3. In the system defined in claim 1 wherein said thermostat means further comprises a first sensor located in said one zone for providing an output signal representative of the actual temperature of said one zone, said second circuit means including means responsive to said output signal from said first sensor for providing a second digital word output signal representative of the actual temperature in said one zone.

4. In the system defined in claim 3 wherein said first circuit means includes means responsive to input signals for establishing the desired temperature in said one zone and providing a first digital word output signal representative of the desired temperature therein.

5. In a system defined in claim 4 wherein said fourth circuit means is selectively controlled by said programmable logic means for comparing a digital word representative of the actual temperature of said one zone and a digital word representative of desired temperature in said one zone for determining the demand for heating or cooling or no demand in said one zone.

6. In the system defined in claim 5 wherein said thermostat means further comprises a second sensor located in the duct for determining the temperature therein and providing an output signal representative of the temperature in the duct, said second circuit means responsive to said output signal from said second sensor and providing a digital word output signal representative of the duct temperature.

7. In the system defined in claim 6 wherein said second sensor is located on an ingress side of said one damper in one of said ducts.

8. In a system defined in claim 7 wherein said fourth circuit means is selectively controlled by said programmable logic means for comparing a digital word representative of zone temperature in said one zone and a digital word representative of duct temperature for determining the desired mode of operation of said one damper.

9. In a system defined in claim 8 wherein said fourth circuit means is selectively controlled by said programmable logic means for determining the desired mode of operation of an HVAC unit in response to the demand for heating or cooling or no demand in said one zone.

10. In the system defined in claim 9 wherein said programmable logic means includes a first program means such that when duct temperature in said one duct is greater than zone temperature a digital word output signal is provided from said fourth circuit means to said logic means for operating said one damper in the heating mode and for operating said one damper in the cooling mode when the temperature in said one duct is less than zone temperature when the HVAC unit is deactivated.

11. In the system defined in claim 10 wherein said programmable logic means includes a second program means such that when sufficient demand for heating or cooling exists in said one zone said fourth circuit means provides a first output signal to said logic means for positioning said one damper in the heating or cooling mode respectively; a second output signal for activating the HVAC unit in the heating or cooling mode respectively; and, when sufficient demand for heating or cooling no longer exists in said one zone, a third output signal for deactivating the HVAC unit.

12. In the system defined in claim 11 wherein said programmable logic means includes a third program means such that when the HVAC unit is deactivated, said fourth circuit means provides digital word output signals to said logic means for operating said one damper in the heating or cooling or ventilation mode in response to a comparison of duct temperature of said one duct, and desired zone temperature and actual zone temperature of said one zone.

13. In the system as defined in claim 12 wherein said programmable logic means includes a fourth program means such that when duct temperature of said one duct is within predetermined limits established by said programmable logic means digital word signals are provided from said fourth circuit means to said logic means for operating said one damper in the ventilation mode when there is no demand for heating or cooling in said one zone or a demand different from that derived from a comparison between actual zone temperature and duct temperature in said one zone.

14. In the system as defined in claim 13 wherein said thermostat means includes means for providing information to peripheral circuit means, the information including any digital word signal associated with said first, second, and third circuit means and said programmable logic means.

15. In the system as defined in claim 14 wherein said thermostat means includes indicating means for providing data indicative of the information in any digital word signal associated with said first, second, and third circuit means and said programmable logic means.

16. In a system defined in claim 15 wherein said fourth circuit means is selectively controlled by said programmable logic means for determining the desired mode of operation of an HVAC unit in response to data received by said third circuit means representative of the temperature of air in each said zone other than said one zone and in response to data indicative of the condition of air in said one zone.

17. In the system as defined in claim 16 wherein said thermostat control means provides data to peripheral circuits for controlling the condition of air in each other zone.

18. In the system as defined in claim 17, wherein said fourth circuit means is selectively controlled by said programmable logic means in response to data received by said third circuit means indicative of the demand for heating or cooling or no demand from each other zone and in response to data indicative of the demand for heating or cooling or no demand in said one zone for providing output signals representative of the desired mode of operation of the HVAC unit when the number of zones having demand for heating or cooling equals or exceeds a predetermined number established by said first circuit means.

19. In the system as in claim 18 wherein said programmable logic means includes fifth program means such that when demand for heating or cooling exists in a number of zones equal to or exceeding the predetermined number established by said first circuit means, said fourth circuit means provides first output signals to the peripheral circuit means associated with said other zones indicative of the desired mode of the HVAC unit, a second signal to said logic means for operating the damper associated with said one zone in the heating or cooling mode, respectively, a third signal to said logic means for operating the HVAC unit in the heating or cooling mode, respectively; and a fourth output signal to said logic means for deactivating the HVAC unit when sufficient demand for heating or cooling no longer exists.

20. In the system defined in claim 19 wherein said programmable logic means includes a sixth program means such that when the number of zones demanding heating or cooling equals or exceeds a predetermined number established by said first circuit means, the zone with the greatest demand is chosen as a reference zone and the HVAC unit is operated by said logic means in the heating or cooling mode, respectively, until said reference zone is substantially satisfied.

21. In the system defined in claim 20 wherein said programmable logic means includes a seventh program means such that when the number of zones demanding heating is equal to the number of zones demanding cooling, each said number being greater than a predetermined number established by said first circuit means the fourth circuit means provides a first output signal to said peripheral circuit means and to said logic means for operating all dampers in a mode coincident with the heating or cooling mode of the zone with the greatest demand, a second output signal to said logic means for activating the HVAC unit in a mode coincident with the demand for heating or cooling mode of the zone with the greatest demand, and a third output signal to said logic means for deactivating the HVAC unit when the demand for heating or cooling has been substantially satisfied in the zone with the greatest demand.

22. In the system defined in claim 21 wherein said programmable logic means includes an eighth program means such that when the HVAC unit has been activated in the heating or cooling mode duct temperature associated with one said zone and data indicative of duct temperature in each other said zones received by said third circuit means is compared with first predetermined limits established by said programmable logic means and said fourth circuit means provides an output signal to said logic means for increasing the heating or cooling supplied by the HVAC unit when duct temperature is not within the predetermined limits.

23. In the system defined in claim 22 wherein said programmable logic means includes a ninth program means such that when duct temperature in any zone exceeds a second predetermined limit established by said programmable logic means, the said logic means for deactivating the HVAC unit irrespective of the demand for heating or cooling in any zone.

24. In the system defined in claim 23 wherein said programmable logic means includes a tenth program means such that, when insufficient demands for heating of cooling for operation of an HVAC unit exists and the duct temperature associated with said one zone is not within the predetermined setpoints for the ventilation mode, said fourth circuit means provides an output signal to said logic means for operating said one damper associated with said one zone in the heating or cooling mode in response to a comparison of actual zone. temperature and duct temperature associated with said one zone 25. In the system as defined in claim 24 wherein said programmable logic means includes an eleventh program means such that, when the zone having the greatest demand has been chosen as a first reference zone during operation of the HVAC unit in the heating or cooling mode, another zone is chosen as the reference zone if said other zone develops a greater demand for heating or cooling respectively than said first reference zone and the HVAC unit is operated by said logic means in the heating or cooling mode respectively until said other zone is substantially satisfied.

26. In the system as defined in claim 1, wherein said operating limits established by said first circuit means includes the desired condition of the air in said one zone during a plurality of distinct time periods, said fourth circuit means responsive to signals including data indicative of the real time for operating said control means of said one damper and said first control means during a plurality of distinct time periods.

27. In the system as defined in claim 26, wherein said thermostat means includes means for providing information to peripheral circuit means, the information including any digital word signal associated with said first, second, third circuit means, said programmable logic means, and data indicative of the real time.

28. In the system as defined in claim 26 wherein said operating limits are temperature limits, said first circuit means including means responsive to input signals establishing the temperature desired in said one zone during a plurality of distinct time periods, for providing digital word output signals representative of the desired temperature therein during said time periods.

29. In the system defined in claim 28 wherein said thermostat means further comprises a first sensor located in said one zone for providing an output signal representative of the actual temperature of said one zone, said second circuit means including means responsive to said output signal from said first sensor for providing a second digital word output signal representative of the actual temperature in said one zone.

30. In a system defined in claim 29 wherein said fourth circuit means is selectively controlled by said programmable logic means for comparing a digital word representative of the actual temperature of said one zone and a digital word representative of desired temperature in said one zone during a distinct time period for determining the demand for heating or cooling or no demand in said one zone during said time period.

31. In the system defined in claim 30 wherein said thermostat means further comprises a second sensor located on an ingress side of said one damper in the duct for determining the temperature therein and providing an output signal representative of the temperature in the duct, said second circuit means responsive to said output signal from said second sensor and providing a digital word output signal representative of the duct temperature.

32. In a system defined in claim 31 wherein said fourth circuit means is selectively controlled by said programmable logic means for comparing a digital word representative of zone temperature in said one zone and a digital word representative of duct temperature for determining the desired mode of operation of said one damper during a distinct time period.

33. In a system defined in claim 32 wherein said fourth circuit means is selectively controlled by said programmable logic means for determining the desired mode of operation of an HVAC unit in response to the demand for heating or cooling or no demand in said one zone during a distinct time period.

34. In the system defined in claim 33 wherein said programmable logic means includes a first program means such that when duct temperature in said one duct is greater than zone temperature a digital word output signal is provided from said fourth circuit means to said logic means for operating said one damper in the heating mode and for operating said one damper in the cooling mode when the temperature in said one duct is less than zone temperature when the HVAC unit is deactivated during a distinct time period.

35. In the sytem defined in claim 34 wherein said programmable logic means includes a second program means such that when sufficient demand for heating or cooling exists in said one zone during a distinct time period said fourth circuit means provides a first output signal to said logic means for positioning said one damper in the heating or cooling mode respectively; a second output signal for activating the HVAC unit in the heating or cooling mode respectively; and, when sufficient demand for heating or cooling no longer exists in said one zone, a third output signal for deactivating the HVAC unit.

36. In the system defined in claim 35 wherein said programmable logic means includes a third program means such that when the HVAC unit is deactivated, said fourth circuit means provides digital word output signals to said logic means for operating said one damper in the heating or cooling or ventilation mode in response to a comparison of duct temperature of said one duct desired zone temperature during a distinct time period and actual zone temperature of said one zone.

37. In the system as defined in claim 36 wherein said programmable logic means includes a fourth program means such that when duct temperature of said one duct is within predetermined limits established by said programmable logic means digital word signals are provided from said fourth circuit means to said logic means for operating said one damper in the ventilation mode when there is no demand for heating or cooling in said one zone or a demand different from that derived from a comparison between actual zone temperature and duct temperature in said one zone.

38. In the system as defined in claim 37 wherein said thermostat means includes indicating means for providing data indicative of the real time and the information in any digital word signal associated with said first, second, and third circuit means and said programmable logic means.

39. In a system as defined in claim 38 wherein said fourth circuit means is selectively controlled by said programmable logic means for determining the desired mode of operation of an HVAC unit during a distinct time period in response to data received by said third circuit means representative of the temperature of air in each said zone other than said one zone and in response to data indicative of the condition of air in said one zone.

40. In the system as defined in claim 39 wherein said thermostat control means provides data to peripheral circuits for controlling the condition of air in each other zone including data indicative of real time.

41. In the system as defined in claim 40 wherein said fourth circuit means is selectively controlled by said programmable logic means in response to data received by said third circuit means indicative of the demand for heating or cooling or no demand from each other zone and in response to data indicative of the demand for heating or cooling or no demand in said one zone for providing output signals representative of the desired mode of operation of the HVAC unit during a distinct time period when the number of zones having demand for heating or cooling equals or exceeds a predetermined number established by said first circuit means.

42. In the system as in claim 41 wherein said programmable logic means includes fifth program means such that when demand for heating or cooling exists during a distinct time period in a number of zones equal to or exceeding the predetermined number established by said first circuit means, said fourth circuit means provides first output signals to the peripheral circuit means associated with said other zones indicative of the desired mode of the HVAC unit, a second signal to said logic means for operating the damper associated with said one zone in the heating or cooling mode, respectively, a third signal to said logic means for operating the HVAC unit in the heating or cooling mode, respectively; and a fourth output signal to said logic means for deactivating the HVAC unit when sufficient demand for heating or cooling no longer exists.

43. In the system defined in claim 42 wherein said programmable logic means includes a sixth program means such that when the number of zones demanding heating or cooling during a distinct time period equals or exceeds a predetermined number established by said first circuit means, the zone with the greatest demand is chosen as a reference zone and the HVAC unit is operated by said logic means in the heating or cooling mode, respectively, until said reference zone is substantially satisfied.

44. In the system defined in claim 43 wherein said programmable logic means includes a seventh program means such that when the number of zones demanding heating is equal to the number of zones demanding cooling during a distinct time period, each said number being greater than a predetermined number established by said first circuit means the fourth circuit means provides a first output signal to said peripheral circuit means and to said logic means for operating all dampers in a mode coincident with the heating or cooling mode of the zone with the greatest demand, a second output signal to said logic means for activating the HVAC unit in a mode coincident with the demand for heating or cooling mode of the zone with the greatest demand, and a third output signal to said logic means for deactivating the HVAC unit when the demand for heating or cooling has been substantially satisfied in the zone with the greatest demand.

45. In the system defined in claim 44 wherein said programmable logic means includes an eighth program means such that when the HVAC unit has been activated in the heating or cooling mode during a distinct time period duct temperature associated with one said zone and data indicative of duct temperature in each other said zones received by said third circuit means is compared with first predetermined limits established by said programmable logic means and said fourth circuit means provides an output signal to said logic means for increasing the heating or cooling supplied by the HVAC unit when duct temperature is not within the predetermined limits.

46. In the system defined in claim 45 wherein said programmable logic means includes a ninth program means such that when duct temperature in any zone exceeds a second predetermined limit established by said programmable logic means, the said fourth circuit means provides an output signal to said logic means for deactivating the HVAC unit irrespective of the demand for heating or cooling in any zone during any distinct time period.

47. In the system defined in claim 46 wherein said programmable logic means excludes a tenth program means such that, when insufficient demand for heating or cooling for operation of an HVAC unit exists during a distinct time period and the duct temperature associated with said one zone is not within the predetermined setpoints for the ventilation mode, said fourth circuit means provides an output signal to said logic means for operating said one damper associated with said one zone in the heating or cooling mode in response to a comparison of actual zone temperature and duct temperature assocated with said one zone.

48. In the system defined in claim 47 wherein said programmable logic means includes an eleventh program means such that, when the zone having the greatest demand has been chosen as a first reference zone during operation of the HVAC unit in the heating or cooling mode during a distinct time period, another zone is chosen as a second reference zone if said other zone develops a greater demand for heating or cooling respectively and the HVAC unit is operated by said logic means in the heating or cooling mode respectively until said second reference zone is substantially satisfied.

49. In a system for monitoring and controlling the condition of air in a zone within predetermined operating limits using a single zone HVAC unit, operated by a control means, in which conditioned air passes into the zone in a duct communicating with the zone, a thermostat means for operating said control means, said thermostat means comprising:
    first circuit means responsive to input signals for establishing operating limits for the zone and providing a first digital word output signal representative of said operating limits, said first circuit means including means responsive to input signals for establishing the desired temperature in the zone and providing a first digital word output signal representative of the desired temperature therein;
    second circuit means responsive to input signals indicative of the actual condition of air in said one zone for providing a second digital word output signal representative of the actual condition of air therein;
    a first sensor located in the zone for providing an output signal representative of the actual temperature of the zone, said second circuit means including means responsive to said output signal from said first sensor for providing a second digital word output signal representative of the actual temperature in said one zone;
    a second sensor located in the duct for determining the temperature therein and providing an output signal representative of the temperature in the duct, said second circuit means responsive to said output signal from said second sensor and providing a digital word output signal representative of the duct temperature;
    third circuit means responsive to output signals from said first and second circuit means for providing third digital word output signals for operating said control means of the HVAC unit; said third circuit means is selectively controllable and is operable and adapted for comparing a digital word representative of the actual temperature of the zone and digital word representative of desired temperature in the zone for determining the demand for heating or cooling or no demand in the zone;
    programmable logic means for providing digital word input signals to said third circuit means for selectively controlling said third circuit means; and
    logic means for selectively operating said control means in response to respective said third digital word input signals from said third circuit means.

50. In a system defined in claim 49 wherein said third circuit means is selectively controlled by said programmable logic means for determining the desired mode of operation of an HVAC unit in response to the demand for heating or cooling or no demand in the zone said third circuit means providing an output signal to said logic means for actuating the HVAC unit in the heating or cooling mode respectively.

51. In the system defined in claim 50 wherein said programmable logic means includes a first program means such that when the HVAC unit has been activated in the heating or cooling mode duct temperature associated with the zone is compared with first predetermined limits established by said programmable logic means and said third circuit means provides an output signal to said logic means for increasing the heating or cooling supplied by the HVAC unit when duct temperature is not within the predetermined limits.

52. In the system defined in claim 51 wherein said programmable logic means includes a second program means such that when duct temperature in the zone exceeds a second predetermined limit established by said programmable logic means, said third circuit means provides an output signal to said logic means for deactivating the HVAC unit irrespective of the demand for heating or cooling in the zone.

53. In the system as defined in claim 49 wherein said operating limits established by said first circuit means includes the desired condition of the air in said one zone during a plurality of distinct time periods, said third circuit means responsive to signals including data indicative of the real time for operating said control means of the HVAC unit during a plurality of distinct time periods.

54. In the system as defined in claim 53 wherein said operating limits are temperature limits said first circuit means including means responsive to input signals establishing the temperature desired in the zone during a plurality of distinct time periods, for providing digital word output signals representative of the desired temperature therein during said time periods.

55. In a system defined in claim 54 wherein said third circuit means is selectively controlled by said programmable logic means for comparing a digital word representative of the actual temperature of the zone and a digital word representative of desired temperature in the zone for determining the demand for heating or cooling or no demand in the zone and for determining the desired mode of operation of an HVAC unit in response to the demand for heating or cooling or no demand in the zone, during a distinct time period and providing an output signal to said logic means for activating the HVAC unit in the heating or cooling mode respectively.

56. In the system defined in claim 55 wherein said programmable logic means includes a third program means such that when the HVAC unit has been activated in the heating or cooling mode during a distinct time period duct temperature associated with the zone is compared with first predetermined limits established by said programmable logic means and said third circuit means provides an output signal to said logic means for increasing the heating or cooling supplied by the HVAC unit when duct temperature is not within the predetermined limits.

57. In the system defined in claim 56 wherein said programmable logic means includes a fourth program means such that when duct temperature in the zone exceeds a second predetermined limit established by said programmable logic means, said third circuit means provides an output signal to saidllogic means for deactiving the HVAC unit irrespective of the demand for heating or cooling in the zone during any distinct time period.

58. In a system for monitoring and controlling the condition of air in a zone within predetermined operating limits using a single zone HVAC unit, operated by a first control means, in which conditioned air passes into the zone via a damper, operated by a control means, in a duct communicating with the zone, a thermostat means for operating said control means for the damper in the zone, said thermostant means comprising:
- first circuit means responsive to input signals for establishing operating limits for the zone and providing a first digital word output signal representative of said operating limits;
- second circuit means responsive to input signals indicative of the actual condition of air in said one zone for providing a second digital word output signal representative of the actual condition of air therein;
- a first sensor located in the zone for providing an output signal representative of the actual temperature of the zone, said second circuit means including means responsive to said output signal from said first sensor for providing a second digital word output signal representative of the actual temperature in the zone;
- third circuit means adapted to be coupled to a peripheral circuit means for receiving data from a peripheral circuit means and for providing a third digital word output signal representative of the information contained in such data;
- fourth circuit means responsive to output signals from said first, second, and third circuit means for providing fourth digital word output signals for operating said control means of said damper;
- programmable logic means for providing digital word input signals to said fourth circuit means for selectively controlling said fourth circuit means; and
- logic means for selectively operating said one damper control means in response to respective said fourth digital word input signals from said fourth circuit means.

59. In the system as defined in claim 58 wherein said thermostat means includes means for providing information to peripheral circuit means, the information including any digital word signal associated with said first, second, and third circuit means and said programmable logic means.

60. In the system defined in claim 58 wherein said first circuit means includes means responsive to input signals for establishing the desired temperature in the zone and providing a first digital word output signal representative of the desired temperature therein.

61. In a system defined in claim 60 wherein said fourth circuit means is selectively controlled by said programmable logic means for comparing a digital word representative of the actual temperature of the zone and a digital word representative of desired temperature in the zone for determining the demand for heating or cooling or no demand in the zone.

62. In the system defined in claim 58 wherein said thermostat means further comprises a second sensor located in the duct on the ingress side of the damper for determining the temperature therein and providing an output signal representative of the temperature in the duct, said second circuit means responsive to said output signal from said second sensor and providing a digital word output signal representative of the duct temperature.

63. In a system defined in claim 62 wherein said fourth circuit means is selectively controlled by said programmable logic means for comparing a digital word representative of zone temperature in the zone and a digital word representative of duct temperature for determining the desired mode of operation of the damper.

64. In the system defined in claim 63 wherein said programmable logic means includes a first program means such that when duct temperature in the duct is greater than zone temperature a digital word output signal is provided from said fourth circuit means to said logic means for operating the damper in the heating mode and for operating the damper in the cooling mode when the temperature in the duct is less than zone temperature when data indicating that the HVAC unit is deactivated has been received by said third circuit means.

65. In the system defined in claim 64 wherein said programmable logic means includes a second program means such that when data received via said third circuit means indicates the HVAC unit is deactivated, said fourth circuit means provides digital word output signals to said logic means for operating the damper in the heating or cooling or ventilation mode in response to a comparison of duct temperature, desired zone temperature and actual zone temperature of the zone.

66. In the system as defined in claim 65 wherein said programmable logic means includes a third program means such that when duct temperature is within predetermined limits established by said programmable logic means digital word signals are provided from said fourth circuit means to said logic means for operating the damper in the ventilation mode when there is no demand for heating or cooling in the zone or a demand different from that derived from a comparison between actual zone temperature and duct temperature in the zone when the HVAC unit is deactivated.

67. In a system as defined in claim 58 wherein said operating limits established by said first circuit means includes the desired condition of the air in a zone during a plurality of distinct time periods, said third circuit means responsive to signals including data indicative of the real time, said fourth circuit means responsive to output signals from said third circuit means for operating said control means of said damper during a plurality of distinct time periods.

68. In the system as defined in claim 67 wherein said operating limits are temperature limits said first circuit means includes means responsive to input signals establishing the temperature desired in the zone during a plurality of distinct time periods, for providing digital word output signals representative of the desired temperature therein during said time periods.

69. In a system defined in claim 68 wherein said fourth circuit means is selectively controlled by said programmable logic means for comparing a digital word representative of the actual temperature of the zone and a digital word representative of desired temperature in the zone during a distinct time period for determining the demand for heating or cooling or no demand in the zone during said time period and wherein said fourth circuit means is selectively controlled by said programmable logic means for comparing a digital word representative of zone temperature in the zone and a digital word representative of duct temperature for determining the desired mode of operation of the damper during a distinct time period.

70. In the system defined in claim 69 wherein said programmable logic means includes a first program means such that when duct temperature in the duct is greater than zone temperature a digital word output signal is provided from said fourth circuit means to said logic means for operating the damper in the heating mode and for operating the damper in the cooling mode when the temperature in the duct is less than zone temperature when data indicating that the HVAC unit is deactivated has been received by said third circuit means.

71. In the system defined in claim 70 wherein said programmable logic means includes a second program means such that when data received via said third circuit means indicates the HVAC unit is deactivated, said fourth circuit means provides digital word output signals to said logic means for operating the damper in the heating or cooling or ventilation mode in response to a comparison of duct temperature, desired zone temperature during a distinct time period and actual zone temperature of the zone.

72. In the system as defined in claim 71 wherein said programmable logic means includes a third program means such that when duct temperature is within predetermined limits established by said programmable logic means digital word signals are provided from said fourth circuit means to said logic means for operating the damper in the ventilation mode when there is no demand for heating or cooling the zone or a demand different from that derived from a comparison between actual zone temperature and duct temperature in the zone when the HVAC unit is deactivated during a distinct time period.

* * * * *